United States Patent
Perez et al.

(10) Patent No.: US 11,843,501 B2
(45) Date of Patent: Dec. 12, 2023

(54) PARITY DRIFT DETECTION IN CLOUD COMPUTING SYSTEMS

(71) Applicant: Microsoft Technology Licensing, LLC, Redmond, WA (US)

(72) Inventors: Anthony James Perez, Kirkland, WA (US); George Kim, Fairfax, VA (US); John Ryan Park, Fairfax, VA (US); Christian Michael Laney, Kirkland, WA (US); Steven Michael Sternberg, Upper Marlboro, MD (US); Eugene H. Kim, Bellevue, WA (US); Parvez Anandam, Seattle, WA (US); Thomas Stanislaw Rogan, IV, Renston, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/744,142

(22) Filed: May 13, 2022

(65) Prior Publication Data

US 2023/0370321 A1 Nov. 16, 2023

(51) Int. Cl.
*H04L 41/0604* (2022.01)
*H04L 41/50* (2022.01)
*H04L 41/0677* (2022.01)

(52) U.S. Cl.
CPC ...... *H04L 41/0627* (2013.01); *H04L 41/0677* (2013.01); *H04L 41/5032* (2013.01)

(58) Field of Classification Search
CPC ......... G06F 8/65; G06F 8/71; H04L 41/0627; H04L 41/0677; H04L 41/5032

(Continued)

(56) References Cited

U.S. PATENT DOCUMENTS 10,318,285 B1 * 6/2019 Jodoin ................ G06F 11/3612
11,074,058 B1 * 7/2021 Mowatt ............... G06F 3/04817

(Continued)

FOREIGN PATENT DOCUMENTS

WO WO-2021061221 A1 * 4/2021 ......... H04L 41/0609

OTHER PUBLICATIONS

"Cisco Cloud APIC for Azure User Guide, Release 5.0(x)", Retrieved From: https://www.cisco.com/c/en/us/td/docs/switches/datacenter/aci/cloud-apic/5-x/user-guide/cisco-cloud-apic-for-azure-user-guide-50x/m-cloud-apic-azure-user-guide-configuration-drift.html, Mar. 17, 2021, 6 Pages.

(Continued)

*Primary Examiner* — Melvin H Pollack
(74) *Attorney, Agent, or Firm* — RAY QUINNEY & NEBEKER

(57) ABSTRACT

The present disclosure relates to systems, methods, and computer-readable media for determining instances of parity drift in target cloud computing systems as well as determining when instances of parity drift require addressing. For example, in various implementations, a cloud parity drift detection system compiles information about services, configurations, versions, etc. along with additional data from a reference cloud system into a job package and provides the job package to one or more target cloud computing systems. The cloud parity drift detection system can then utilize the job package to compare corresponding information on the reference cloud system to a target data set of the target cloud system to determine instances of parity drift at the target cloud system. Additionally, the cloud parity drift detection system can determine and act when instances of parity drift require addressing.

20 Claims, 11 Drawing Sheets

(58) Field of Classification Search
USPC .......................................... 709/224; 713/1, 2
See application file for complete search history.

(56) References Cited

U.S. PATENT DOCUMENTS

| | | | | |
|---|---|---|---|---|
| 11,074,091 | B1* | 7/2021 | Nayakbomman | G06F 9/455 |
| 11,120,144 | B1* | 9/2021 | Kassam-Adams | |
| | | | | G06F 21/6245 |
| 11,226,807 | B1* | 1/2022 | Katz | H04L 63/20 |
| 11,323,317 | B1* | 5/2022 | Levin | H04L 67/34 |
| 11,470,149 | B2* | 10/2022 | Deriso | H04L 67/01 |
| 11,507,655 | B1* | 11/2022 | Ketireddy | G06F 8/20 |
| 11,522,747 | B1* | 12/2022 | Segler | H04L 41/0627 |
| 11,528,191 | B1* | 12/2022 | Ficara | H04L 41/0859 |
| 11,561,844 | B2* | 1/2023 | Kahle | G06F 12/0817 |
| 11,593,075 | B2* | 2/2023 | Liu | G06F 8/35 |
| 11,604,665 | B2* | 3/2023 | Madtha | G06F 16/951 |
| 2009/0077017 | A1 | 3/2009 | Belknap et al. | |
| 2013/0326051 | A1 | 12/2013 | Legendre et al. | |
| 2015/0293952 | A1 | 10/2015 | Ogrinz | |
| 2019/0294596 | A1 | 9/2019 | Yan et al. | |
| 2020/0082296 | A1* | 3/2020 | Fly | G06F 17/18 |
| 2021/0314424 | A1* | 10/2021 | Kolhar | G06F 8/71 |
| 2021/0365256 | A1* | 11/2021 | Cadarette | H04L 63/102 |
| 2022/0138070 | A1* | 5/2022 | Mokashi | G06F 11/324 |
| | | | | 709/224 |
| 2022/0147336 | A1* | 5/2022 | Joshi | H04L 41/082 |
| 2022/0229805 | A1* | 7/2022 | Chakeres | G06F 16/27 |
| 2022/0236976 | A1* | 7/2022 | Wiegley | G06F 8/71 |
| 2022/0321408 | A1* | 10/2022 | Mahimkar | H04L 43/16 |
| 2022/0326930 | A1* | 10/2022 | Nandavar | H04L 67/1097 |
| 2022/0334828 | A1* | 10/2022 | Berube | G06F 3/0631 |
| 2022/0350629 | A1* | 11/2022 | Parry-Barwick | G06F 8/65 |
| 2022/0376970 | A1* | 11/2022 | Chawathe | G06F 11/3452 |

OTHER PUBLICATIONS

Davis, et al.,"Configuration Analyzer For Protection Policies In EOP And Microsoft Defender For Office 365", Retrieved From: https://docs.microsoft.com/en-us/microsoft-365/security/office-365-security/configuration-analyzer-for-security-policies?view=o365-worldwide, Mar. 26, 2022, 7 Pages.

"Detect Drift On An Entire Cloudformation Stack", Retrieved from: https://docs.aws.amazon.com/AWSCloudFormation/latest/UserGuide/detect-drift-stack.html, Retrieved On: Apr. 20, 2022, 6 Pages.

"Generate a drift timeline report", Retrieved from: https://docs.netapp.com/us-en/active-iq/task_generate_drift_timeline_report.html, Oct. 14, 2021, 1 Page.

Chabbria, Manish, "Compare A Config Drift Template", Retrieved from: https://docs.netapp.com/us-en/active-iq/task_compare_config_drift_template.html, Oct. 11, 2021, 1 Page.

"International Search Report and Written Opinion Issued in PCT Application No. PCT/US23/015601", dated Jun. 16, 2023, 17 Pages.

* cited by examiner

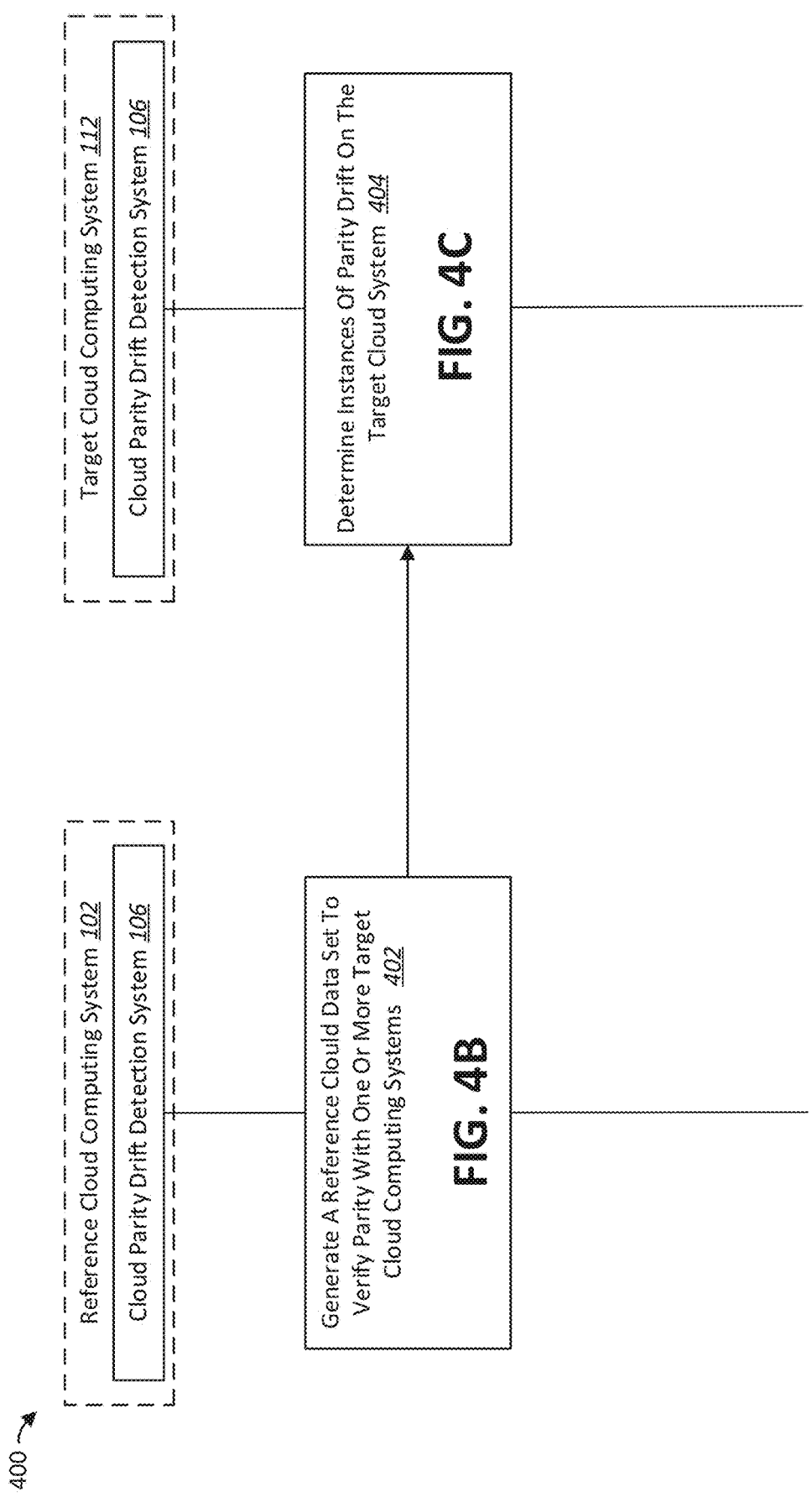

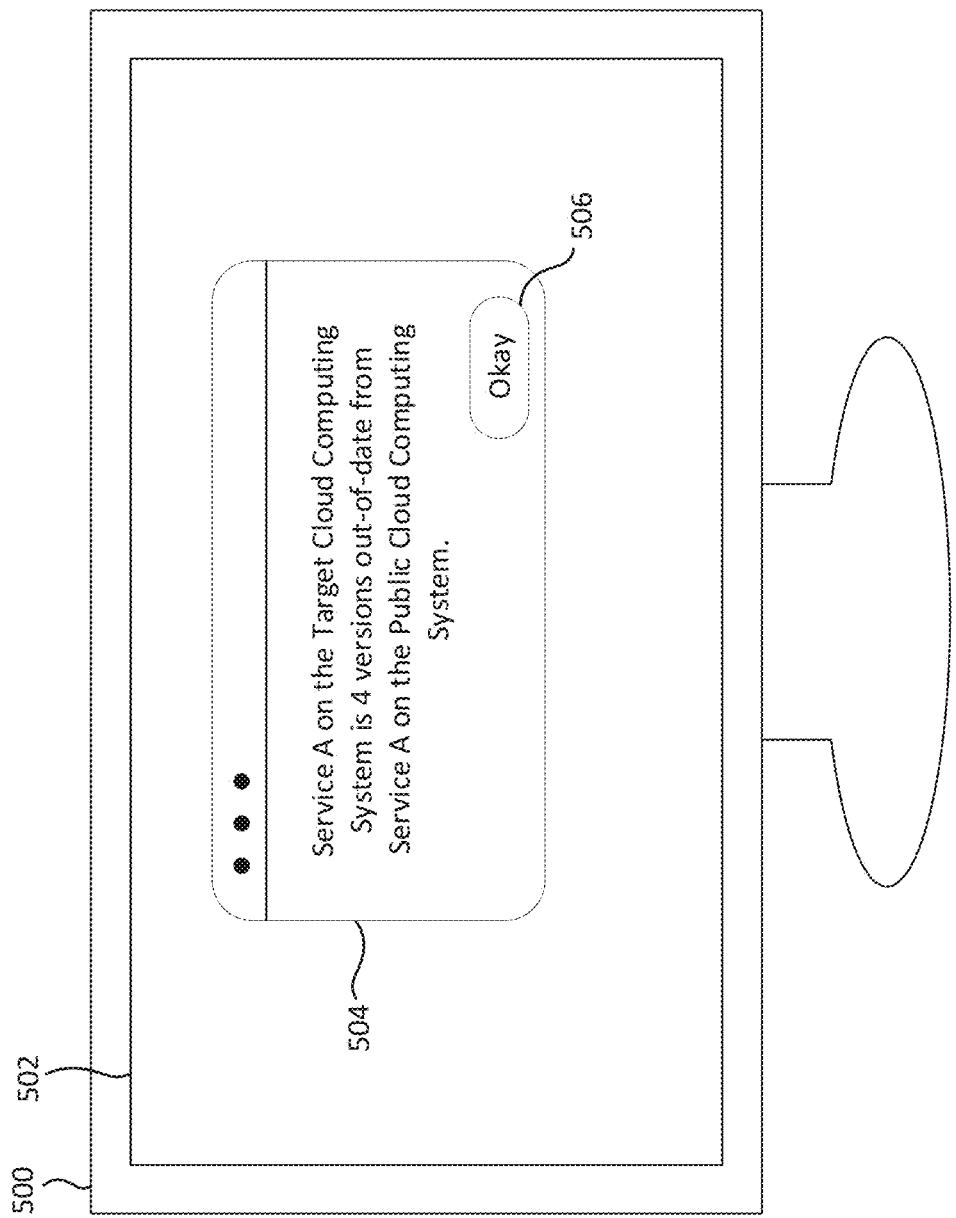

PARITY DRIFT DETECTION IN CLOUD COMPUTING SYSTEMS

BACKGROUND

Recent years have seen significant advancements in hardware and software platforms that implement network devices, such as those found in cloud computing systems. Indeed, cloud computing systems are growing in terms of the features, functions, and services they provide. Additionally, cloud computing systems are growing in terms of redundancy protection, complexity, as well as security features. For instance, different types of cloud computing systems provide varying levels of access and security. For example, cloud computing systems include publicly available systems as well as private systems such as on-premises systems that provide limited access and air-gapped secure systems that are isolated from the Internet.

Despite these and other advances, existing cloud computing systems face several technical shortcomings that result in inefficient, inaccurate, and inflexible operations, particularly in the area of cloud computing system resource management. For example, when a private cloud computing system is created, there is an expectation that it will operate similarly to public systems in terms of features, functions, and services. However, as public systems update, grow, and evolve, many private systems are slow to follow suit. As a result, these private systems begin to "drift" from those of their public counterpart systems.

In many instances, parity drift—when a target cloud computing system drifts away from a source or reference cloud computing system—commonly goes undetected. For example, due to the complexities and sheer size of most cloud computing systems, it is not feasible to continuously identify every feature and service across a cloud computing system and verify whether the feature or service has drifted from parity. Moreover, the architecture of many private cloud computing systems prevents outside systems from gaining the access necessary to perform parity drift evaluations and provide crucial updates. Indeed, some cloud computing systems, such as air-gapped systems, are fully isolated from outside communications. These systems, in particular, often suffer from various levels of parity drift.

Further, instances of parity drift in cloud computing systems can cause several problems if not immediately addressed. For example, cloud computing systems that are out of parity can suffer from inaccuracies and inefficiencies (e.g., bugs, errors, and outdated services), which are not found in a corresponding reference cloud computing system. In various cases, some instances of parity drift in a cloud computing system are less crucial to address, such as a service that underwent a minor interface update. However, existing cloud computing systems are absent of reliable mechanisms to identify instances of parity drift with respect to a reference cloud computing system, let alone determine when parity drift warrants speedy action.

These and other problems result in significant inefficiencies, inaccuracies, and inflexibilities of existing cloud computing systems with respect to parity drift.

BRIEF DESCRIPTION OF THE DRAWINGS

The detailed description provides one or more implementations with additional specificity and detail through the use of the accompanying drawings, as briefly described below.

FIGS. 4A-4C illustrate a sequence flow diagram for determining parity drift for a target cloud computing system in accordance with one or more implementations.

FIG. 5 illustrates providing an indication of parity drift on a computing device in accordance with one or more implementations.

DETAILED DESCRIPTION

Figure 1A:
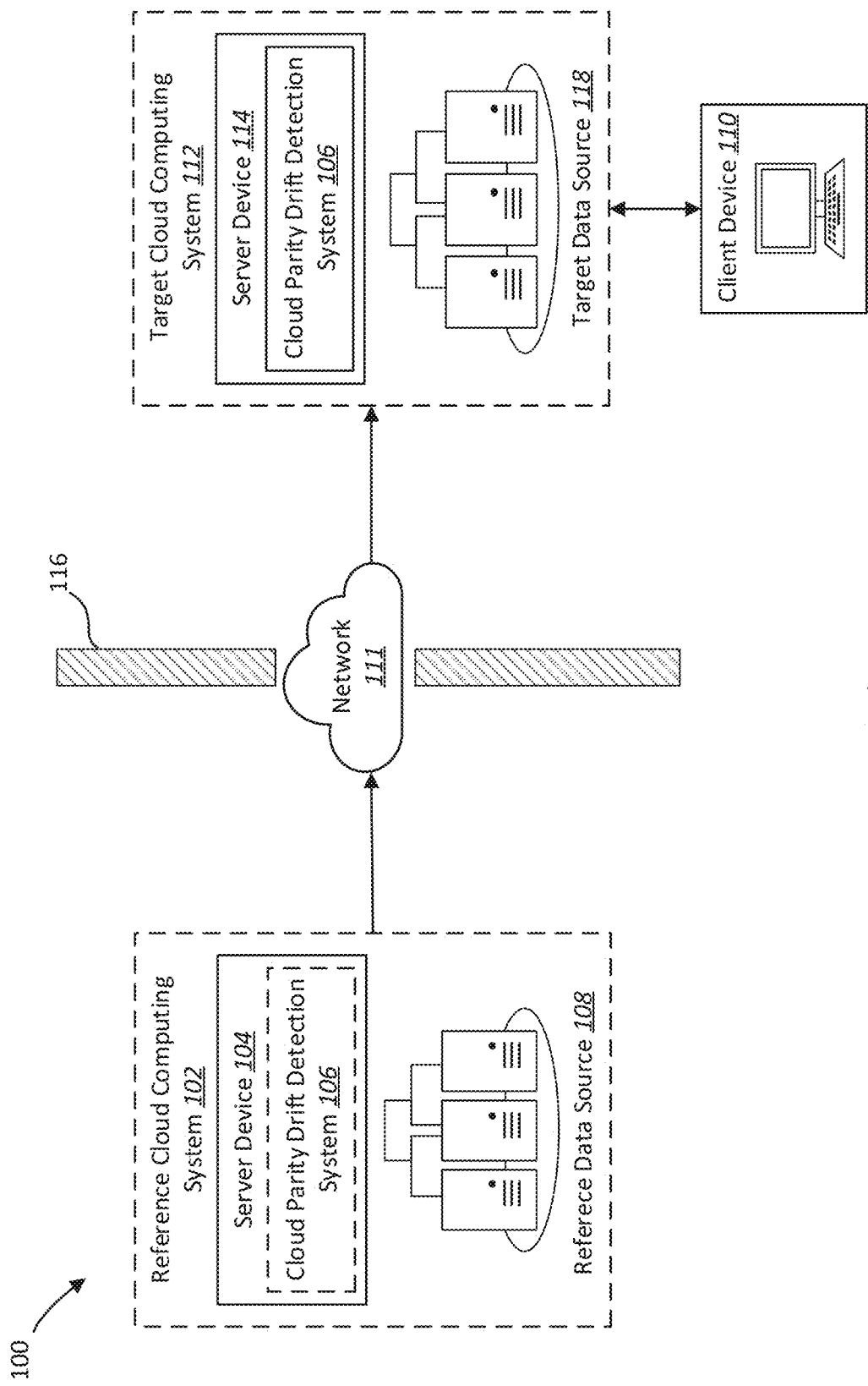
FIGS. 1A-1B illustrate a diagram of a computing system environment where a cloud parity drift detection system is implemented in accordance with one or more implementations.

Implementations of the present disclosure provide benefits and/or solve one or more of the foregoing or other problems in the art with systems, non-transitory computer-readable media, and methods utilizing a cloud parity drift detection system to determine instances of parity drift in target cloud computing systems as well as determine when instances of parity drift require addressing. More specifically, the cloud parity drift detection system (or simply "parity drift system") compiles information about services, configurations, versions, etc. along with additional data from a reference cloud system into a job package and provides the job package to one or more target cloud computing systems. The parity drift system can then utilize the job package to compare reference cloud system information to corresponding information on a target cloud system to determine instances of parity drift on the target cloud system. Further, the parity drift system can determine when one or more instances of parity drift require addressing as well as act to remedy the parity drift.

To illustrate, in one or more implementations, the parity drift system receives, at a target cloud computing system, a job package that includes a query set and a reference data set generated by running the query set on feature configurations of the reference cloud computing system. In response, the parity drift system can generate a target data set by running the same query set from the job package on the target cloud computing system (e.g., on feature configurations of services on the target cloud computing system). Additionally, the parity drift system can generate a parity report based on comparing the reference data set and the target data set as well as determine parity scores for the target cloud computing system by comparing the parity report to one or more parity score thresholds. Further, the parity drift system can provide parity alerts based on the parity scores to facilitate resolving the parity drift.

Within the context of cloud computing systems, the term "parity" refers to comparing one cloud computing system (e.g., a target cloud computing system or simply "target cloud system") to another cloud computing system (e.g., a reference cloud computing system or simply "reference cloud system"). Often, the reference cloud system is a public cloud system that is continuously maintained and updated. Further, the target cloud system can be another public system, but more often is a private or semi-private system that includes various access restrictions that prevent it from being updated in the same manner as the reference cloud system.

In some instances, the parity drift system can determine whether features, services, and/or functions on the target cloud system match those on the reference cloud system. If not, the parity drift system can determine an amount of drift (i.e., change or variation) between the cloud systems. In various implementations, the parity drift system can measure parity drift based on configuration settings (e.g., system and service settings), features (e.g., offered services and functions), user experiences (e.g., customer-facing tools), quality (e.g., system uptime, scaling, and resilience), and/or other metrics.

In some instances, parity drift refers to how far away from being at parity a target cloud system is compared to the reference cloud system. In one or more implementations, the parity drift system determines a simple binary parity metric that indicates whether a system (or a portion thereof such as a service) is at parity. In some implementations, the parity drift system determines multiple dimensions of parity drift across a cloud system. For example, the parity drift system determines that a target cloud system is out of parity based on determining the number of particular parity drift instances.

As provided below, compared to conventional systems, the parity drift system disclosed herein provides several technical benefits in terms of computing efficiency, accuracy, and flexibility. Indeed, the parity drift system provides several practical applications that deliver benefits and/or solve problems associated with parity drift on cloud computing systems.

To elaborate, in one or more implementations, the parity drift system provides a solution for determining instances of parity drift in cloud computing systems. In particular, the parity drift system provides a solution for determining instances of parity drift in private cloud computing systems, such as on-premises, sovereign, and air-gapped cloud computing systems. Indeed, the parity drift system can determine instances of parity drift for a cloud computing system that restricts incoming traffic and/or that prohibits outgoing traffic.

In various implementations, the parity drift system provides significant efficiency and accuracy gains to cloud computing systems by identifying and addressing instances of parity drift. Indeed, the parity drift system can identify systems, services, functions, features, configurations, etc. in a target cloud system that have drifted beyond a threshold parity amount, which could significantly impact the operation of the target cloud system. In some implementations, the parity drift system can automatically address one or more of the instances of parity drift at the target cloud system.

As mentioned, in various implementations, the parity drift system improves accuracy to cloud computing systems by utilizing job packages that aggregate a query set with multiple data sets along with additional parity drift information. For example, in one or more implementations, the parity drift system receives a job package that includes a reference data set that indicates configuration settings on a reference cloud system as well as a query set used to generate the reference data set. The parity drift system can then use the same query set to generate a target data set on the target cloud system. By including the query set in the job package, the parity drift system ensures that equivalent data sets are generated on the different cloud systems. Indeed, unlike existing systems, which utilize default query sets that themselves can drift, the parity drift system improves accuracy by ensuring that the same query set is used to generate all data sets being compared to each other.

In additional implementations, the parity drift system continues to aggregate information into the job package. For example, upon generating a parity report by comparing the reference data set and the target data set, the parity drift system adds the parity report to the job package. Similarly, upon determining parity grades and/or scores from the parity report, the parity drift system can add the parity grades to the job package. Additionally, in some implementations, the parity drift system can archive the job package and reference it when determining future parity reports (e.g., when determining trends in parity drift). In this manner, the parity drift system improves accuracy by preserving correct records, which enables the parity drift system to accurately determine instances of parity drift in a target cloud system.

In various implementations, the parity drift system provides improved flexibility by providing parity drift detection customizations. For example, while the parity drift system provides general configurations for detecting instances of parity drift at a target cloud system, in one or more implementations, the parity drift system utilizes customized parity drift thresholds for specific services. Similarly, the parity drift system can flexibly provide customizations when determining whether to alert and/or remedy detected instances of parity drift.

As illustrated in the foregoing discussion, the present disclosure utilizes a variety of terms to describe the features and advantages of one or more implementations described herein. For instance, as used herein, a "cloud computing system" refers to a network of connected computing devices (e.g., network devices) that provide various services to client devices. For instance, a cloud computing system can be a distributed computing system that includes a collection of physical server devices (e.g., server nodes) organized in a hierarchical structure including computing zones, clusters, virtual local area networks (VLANs), racks, load balancers, fault domains, etc.

In addition, features and functionalities described in connection with cloud computing systems can similarly relate to racks, fault domains, or other hierarchical structures of physical server devices. The cloud computing system may refer to a private or public cloud computing system. In some implementations, a cloud computing system can include an orchestrator that manages servers, server clusters, server racks, server nodes, and/or other server groups of computing devices. In various implementations, a computing device that includes one or more virtual machines (e.g., a "host device") can include a hypervisor that facilitates hosting virtual machines on the host device.

As mentioned above, a cloud computing system can refer to a reference cloud computing system or a target cloud computing system. As used herein, a reference cloud computing system (or simply reference cloud system) can refer to a source cloud computing system, a model cloud computing system, a base cloud computing system, a public cloud computing system, or another type of cloud computing system that is used as a template for establishing configuration settings. In some implementations, the reference cloud computing system can be a private cloud computing system. Additionally, as used herein, a target cloud computing system (or simply target cloud system) refers to a private cloud computing system, a sovereign cloud computing system, an on-premises cloud computing system, an air-gapped cloud computing system, a restricted cloud computing system, or another cloud computing system that is being checked for instances of parity drift. In some implementations, the target cloud system is a public cloud computing system.

As used herein, a "virtual machine" refers to an emulation of a computer system on a server node that provides the functionality of one or more applications on the cloud computing system. In various implementations, a host device allocates computing cores and/or memory to virtual machines running on the host device. Virtual machines can provide the functionality needed to execute one or more operating systems. In addition, virtual machines can utilize hypervisors on processors of server devices that support virtual replication of hardware. It will be understood that while specific examples and implementations features and functionality described herein with respect to virtual machines can likewise apply groups of virtual machines and/or compute instance types.

As used herein, the term "query set" refers to one or more queries that request data from a database or another storage device. In various implementations, a query set refers to queries for configuration settings (e.g., query configurations) with respect to services, functions, and features of a cloud computing system. In various implementations, the query set includes queries written in Structured Query Language (SQL), Kusto Query Language (KQL), or another structured query language. Additionally, a query set may refer to requests for system-based settings and data and not user-based data. In various implementations, the parity drift system generates a data set based on responses to executing a query set.

As used herein, the terms "data set" or "cloud data set" can refer to a collection of data with respect to the system-based configurations system of a cloud computing system or a portion thereof. For example, a data set can include versioning information regarding various services, functions, and features of a cloud computing system. In various implementations, a data set includes information regarding various dimensions of a cloud computing system or portion thereof. For instance, a data set includes a schema indicating state information and/or version information of network functions on a cloud computing system without including user data.

As used herein, the term "job package" refers to a collection of configuration information with respect to one or more cloud computing systems. For example, a job package can initially include a query set and a data set. Further, the job package can additionally include information components, such as a second data set, a parity report between the two data sets, and/or parity grades based on the parity report. Moreover, a job package can include additional elements, such as metadata and hashes to identify, verify, and utilize the job package.

In various implementations, the terms "parity report" or "parity dimension report" refer to a collection of information that indicates differences between cloud computing systems or portions thereof. For example, a parity report indicates how corresponding systems or services within two (or more) cloud computing systems compare with each other. In various implementations, a parity report is included within a larger table, data set, or collection of cloud computing system information. In some implementations, a parity report can include parity scores or parity grades based on the significance or one or more portions of the parity report, as further provided below.

Figure 1B:
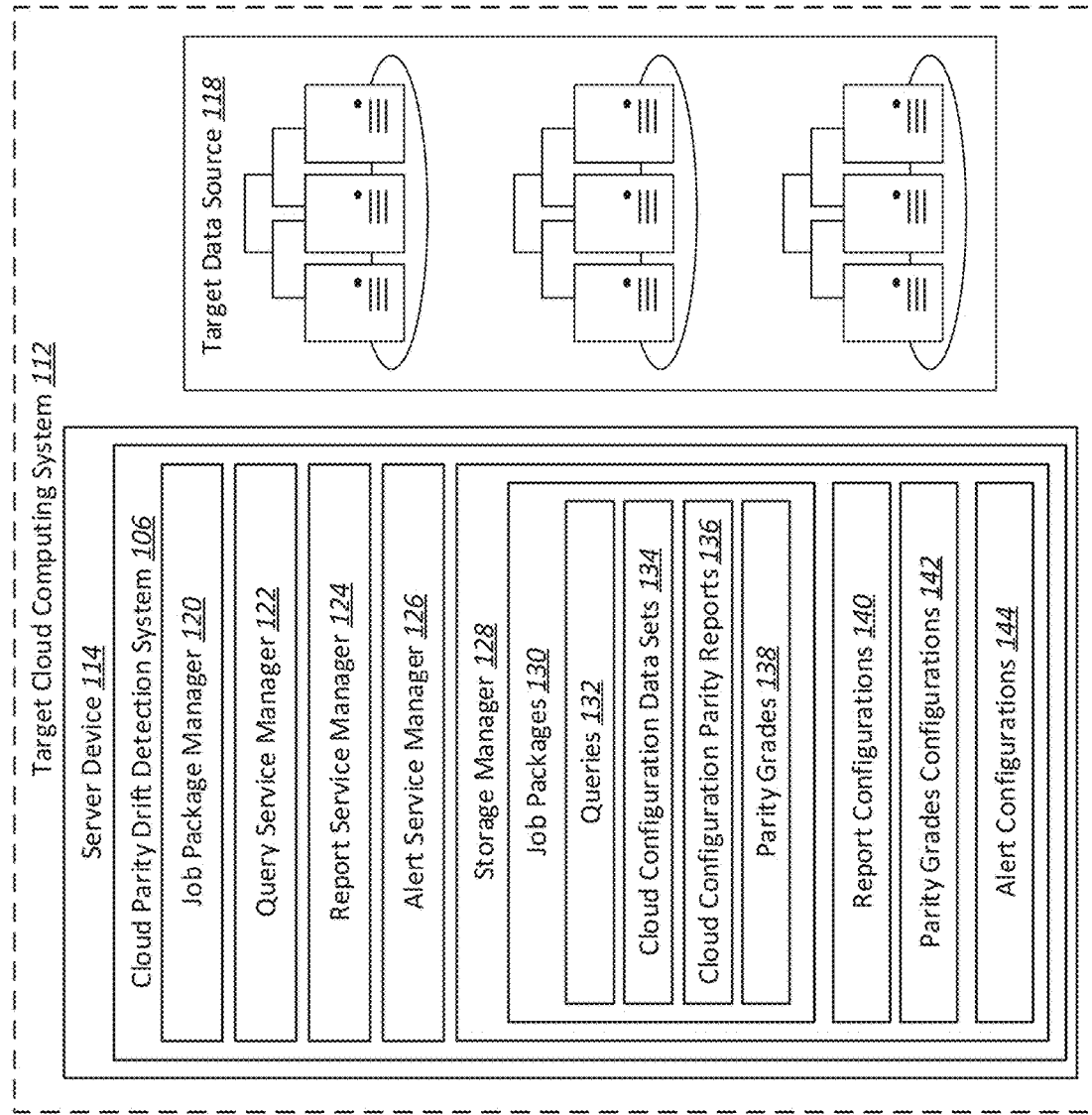

Additional detail will now be provided regarding the parity drift system for detecting parity drift of a cloud computing system. For example, FIGS. 1A-1B illustrate a schematic diagram of an environment 100 (i.e., a digital medium system environment) for implementing a parity drift system 106 (i.e., a cloud parity drift detection system). In particular, FIG. 1A includes the environment 100 and FIG. 1B provides more detail regarding the parity drift system 106.

As shown in FIG. 1A, the environment 100 includes a reference cloud computing system 102 that provides data to a target cloud computing system 112 via a network 111. In various implementations, the cloud computing systems share similar architectures, systems, services, features, and/or functions. For example, in many implementations, the target cloud computing system 112 is designed and/or modeled after the reference cloud computing system 102. In various implementations, the environment 100 includes multiple target cloud computing systems (e.g., link or separate cloud systems managed by the same or different entities). In some implementations, the multiple target cloud computing systems are competing cloud computing system providers. In example implementations, a target cloud computing system is operated by a different entity than operates the reference cloud computing system.

As shown, both the reference cloud computing system 102 and the target cloud computing system 112 include various devices. For example, the reference cloud computing system 102 includes a server device 104 having the parity drift system 106 (or a portion thereof). The reference cloud computing system 102 also includes a reference data source 108, which can include one or more storage devices for storing system-based and/or user-based data. In some implementations, the reference data source 108 includes additional server devices for hosting virtual machines.

Similar to the reference cloud computing system 102, the target cloud computing system 112 includes a server device 114 having the parity drift system 106 (or a portion thereof) and a target data source 118. The server device 114 can include one or more server devices and/or other computing devices. Similarly, the target data source 118 can include various computing devices supporting the functionality of the target cloud computing system 112.

As shown, the environment 100 includes the network 111, which facilitates communications between the cloud computing systems. In certain implementations, the network 111 is a private network. In some implementations, the network 111 is a public network, such as the Internet. Indeed, in one or more implementations, the network 111 allows open communications between cloud computing systems, for example, when both cloud computing systems are public cloud systems.

In various implementations, the network 111 is restricted by a network wall 116 that regulates network traffic. For instance, in some implementations, the network wall 116 is a network device, such as a firewall, that filters incoming data to the target cloud computing system 112 and/or restricts outgoing from the target cloud computing system 112. For instance, if the target cloud computing system 112 is an air-gapped cloud system, the network wall 116 prevents all outgoing network traffic from the target cloud computing system 112. In some implementations, the network 111 does not include the network wall 116.

In addition, the environment 100 includes a client device 110 that communicates with the target cloud computing system 112. For example, the reference data source 108 interfaces with an API of the target cloud computing system 112 to utilize functions of the target cloud computing system 112. In some implementations, the parity drift system 106 on the target cloud computing system 112 can send and/or receive communications regarding parity drift in the target cloud computing system 112. Depending on the architecture and security needs of the target cloud computing system 112, the client device 110 may be connected to the network 111 or may be walled off by the network wall 116 and/or other constraints.

As mentioned above, the target cloud computing system 112 is modeled after the reference cloud computing system 102. Accordingly, when components and elements of the reference cloud computing system 102 are updated, the corresponding components and elements of the target cloud computing system 112 should likewise update to maintain parity. Maintaining parity across separate cloud systems is difficult because of the immense size and complexities of cloud systems. Further, services largely deploy and replicate independently from each other and irregular schedules.

Additionally, this problem compounds when the target cloud computing system 112 is a private and/or restricted cloud system. Indeed, while cloud system engineers that have created the cloud systems can maintain and update the reference cloud computing system 102, they are often restricted from accessing the target cloud computing system 112. Accordingly, the target cloud computing system 112 can quickly, easily, and unknowingly drift from parity with the reference cloud computing system 102 and the instance of parity drift cannot be directly addressed by the cloud system engineers that maintain the reference cloud computing system 102.

To elaborate, in some instances, the target cloud computing system 112 includes very sensitive data. For example, the target cloud computing system 112 is contracted by a state department, financial institution, military, etc. For instance, the target cloud computing system 112 operates as a weapons guidance and defense system of a battlecruiser (this would be an example of an air-gapped cloud system where no outside communication is necessary or permitted). Accordingly, in various implementations, by being isolated from public cloud computing systems, the target cloud computing system 112 can easily and unknowingly drift out of parity with the reference cloud computing system 102.

To combat parity drift, the parity drift system 106 facilitates parity drift detection and, in some cases, automatic corrective actions. As shown, the parity drift system 106 can be included on either the reference cloud computing system 102 or the target cloud computing system 112. In some implementations, the parity drift system 106 (or a portion) is located on both cloud systems. For example, the parity drift system 106 executes a query set on the reference cloud computing system 102 to generate a reference data set. In addition, the parity drift system 106 generates a job package that includes the query set and the reference data set, then sends the job package to the target cloud computing system 112.

Additionally, the parity drift system 106 (e.g., a different instance of the parity drift system 106) receives the job package on the target cloud computing system 112 and executes the same query set from the job package to generate a target data set. Based on the reference data set and the target data set, the parity drift system 106 then determines an instance of parity drift on the target cloud computing system 112. Additional detail regarding the parity drift system 106 is provided in connection with FIG. 1B.

Regarding components of the environment 100, in one or more implementations, the computing devices included in the environment 100 represent one or more types of computing devices including, by way of example, mobile devices, portable devices, wearable devices, desktop computers, server devices, server nodes, server clusters, or other types of computing devices. Additionally, while FIG. 1A illustrates a specific arrangement of the cloud computing systems, the reference cloud computing system 102, the target cloud computing system 112, the client device 110, the network wall 116, and the network 111, the environment 100 can include any number of systems, computing devices, and/or networks. For example, one or more additional client devices can communicate with the reference cloud computing system 102.

In addition, the network 111 may include one or multiple networks that use one or more communication platforms or technologies for transmitting data. For example, in addition to the above disclosure, the network 111 may include the Internet or other data link that enables the transport of electronic data between respective client devices and devices of the cloud computing system. Additional detail regarding these computing devices and networks is provided below in connection with FIG. 7.

As mentioned above, FIG. 1B illustrates detail regarding the parity drift system 106. In particular, FIG. 1B shows the target cloud computing system 112 having the server device 114 and the target data source 118. In addition, as shown, the parity drift system 106 (i.e., the cloud parity drift detection system) includes various components and elements. For example, the parity drift system 106 includes a job package manager 120, a query service manager 122, a report service manager 124, an alert service manager 126, and a storage manager 128. As also shown, the storage manager 128 can include job packages 130 having queries 132, cloud configuration data sets 134, cloud configuration parity reports 136, and parity grades 138; report configurations 140; parity grade configurations 142; and alert configurations 144.

As shown, the parity drift system 106 includes the job package manager 120. In one or more implementations, the job package manager 120 receives, accesses, provides, edits, modifies, identifies, creates, or otherwise manages the job packages 130. For example, the job package manager 120 creates job packages that include queries 132 in a query set, cloud configuration data sets 134 (e.g., reference data sets and a target data sets), cloud configuration parity reports 136 of the target cloud computing system 112, and parity grades 138 of the target cloud computing system 112. For instance, the data sets include one or more schemas indicating state information and/or version information of network functions on a cloud computing system without including user data. In various implementations, the job package manager 120 gradually builds the job packages 130 by adding and/or supplementing various elements in the job packages 130 over time. Additionally, in some implementations, the job package manager 120 archives the job packages 130 for future use by the parity drift system 106.

As shown, the parity drift system 106 includes the query service manager 122. In various implementations, the query service manager 122 facilitates creating, executing, modifying, storing, adding, removing, identifying, accessing, or otherwise managing queries 132. In various implementations, the query service manager 122 runs a query set of queries 132 on both a reference cloud computing system 102 and a target cloud computing system 112 to generate the cloud configuration data sets 134. In addition, the query service manager 122 can interface with a user via a client device to receive, edit, execute, and/or reconfigure queries 132.

As shown, the parity drift system 106 includes the report service manager 124. In various implementations, the report service manager 124 compares, identifies, edits, modifies, receives, accesses, provides, or otherwise manages the cloud configuration parity reports 136 and/or the parity grades 138. For example, the report service manager 124 determines instances of parity drift in the target cloud computing system 112 as well as parity grades for one or more of the instances of parity drift. In some implementations, the report service manager 124 utilizes the report configurations 140 to generate the cloud configuration parity reports 136. In certain implementations, the report service manager 124 enables the report configurations 140 to be customized on a per-service or per-feature level to determine parity drift for corresponding services or features.

As shown, the parity drift system 106 includes the alert service manager 126. In various implementations, the alert service manager 126 manages parity drift alerts. For example, in some implementations, the parity drift system 106 determines to provide an alert indicating an instance of parity drift at the target cloud computing system 112. In these implementations, the alert service manager 126 can provide an alert to a client device or an alert system. In various implementations, the alert service manager 126 utilizes alert configurations 144 to determine when to send out an alert for a detected instance of parity drift. In certain implementations, the alert service manager 126 enables modification of the alert configurations 144.

Additionally, the parity drift system 106 includes the storage manager 128. In various implementations, the storage manager 128 can include any data used by any of the components of the parity drift system 106 in performing features and functionality described herein. For example, the storage manager 128 may include the job packages 130 having queries 132, cloud configuration data sets 134, cloud configuration parity reports 136, and parity grades 138; report configurations 140; parity grade configurations 142; and alert configurations 144.

Figure 2:
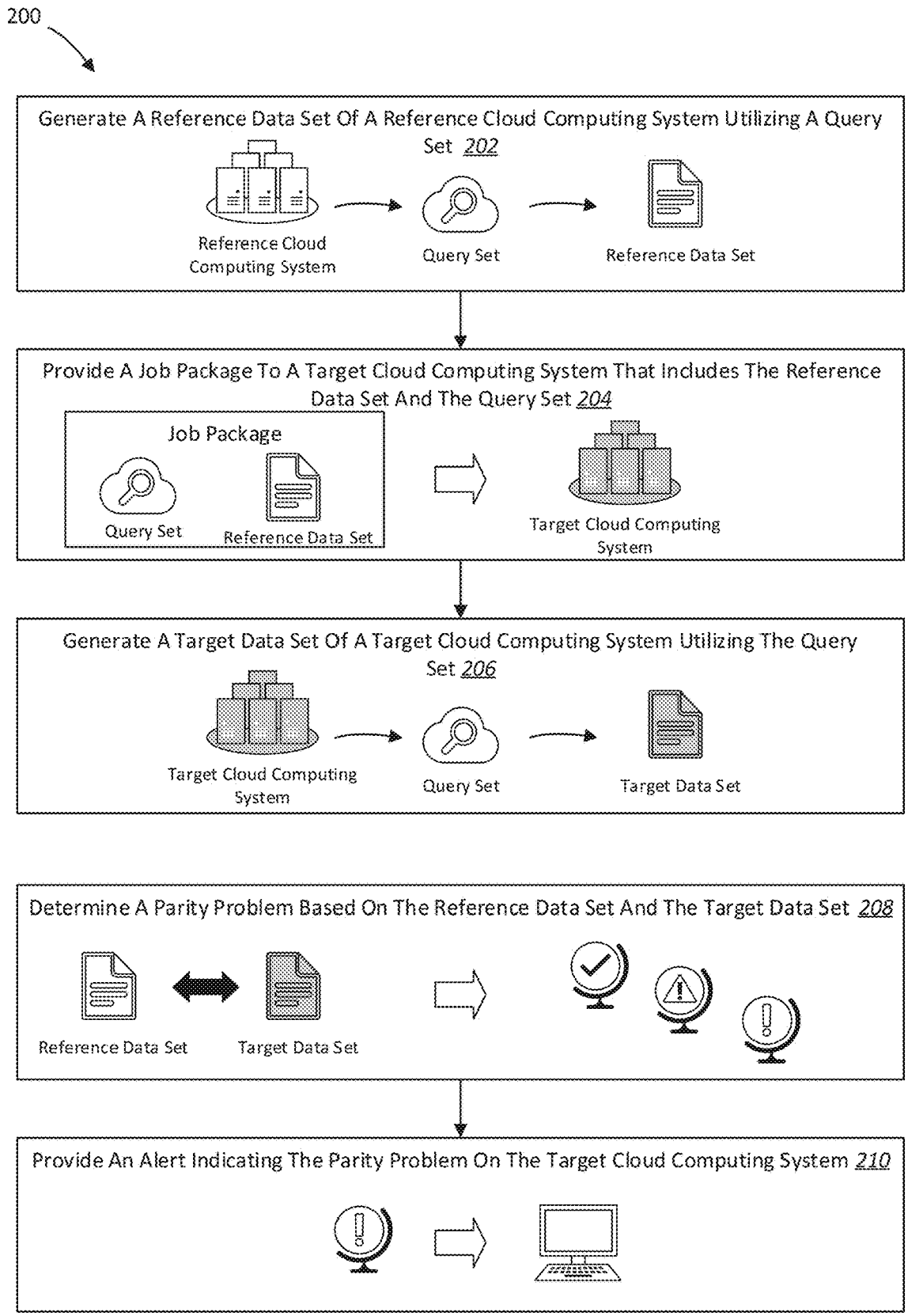
FIG. 2 illustrates an example workflow for determining parity drift for a target cloud computing system in accordance with one or more implementations.

Additional detail in connection with an example implementation of the parity drift system 106 is discussed in connection with FIG. 2. For example, FIG. 2 illustrates an example workflow for determining parity drift for a target cloud computing system in accordance with one or more implementations. As shown, FIG. 2 illustrates a series of acts 200 of the parity drift system 106 for determining instances of parity drift at a target cloud computing system.

As shown in FIG. 2, the series of acts 200 includes an act 202 of generating a reference data set of a reference cloud computing system using a query set. For example, in various implementations, the parity drift system 106 accesses a query set and executes it on data sources of the reference cloud computing system 102 to generate a reference data set (e.g., a public data set). Additional detail regarding using a query set to generate a reference data set is provided below in connection with FIG. 4B.

In addition, FIG. 2 shows that the series of acts 200 includes an act 204 of providing a job package to a target cloud computing system that includes the reference data set and the query set. For instance, in various implementations, the parity drift system 106 can generate a job package that includes the reference data set and the query set. Additionally, the parity drift system 106 can provide the job package to a target cloud computing system. In some implementations, the parity drift system 106 provides the job package to multiple target cloud systems. Additional detail regarding generating and providing a job package is provided below in connection with FIG. 4B.

As shown in FIG. 2, the series of acts 200 includes an act 206 of generating a target data set of a reference cloud computing system using the query set. For example, in various implementations, the parity drift system 106 extracts the query set from the received job package and executes it on data sources of the target cloud computer system to generate the target data set (e.g., a private data set). Indeed, the parity drift system 106 runs the same query set on both the reference cloud system and the target cloud system to ensure that the corresponding data sets align with each other. Additional detail regarding generating a target data set on a target computing system is provided below in connection with FIG. 4C.

As shown, the series of acts 200 includes an act 208 of determining a parity problem based on the reference data set and the target data set. For example, in various implementations, the parity drift system 106 compares portions of the reference data set to corresponding portions of the target data set to determine if parity drift has occurred. In some implementations, when an instance of parity drift is detected, the parity drift system 106 determines the amount of parity drift that has occurred. Additional detail regarding determining instances of parity drift is provided below in connection with FIG. 4C.

In addition, FIG. 2 shows that the series of acts 200 includes an act 210 of providing an alert indicating the parity drift problem on the target computing system. For instance, in various implementations, the parity drift system 106 determines when an alert is necessary and, in response, provides a corresponding alert. In various implementations, the parity drift system 106 identifies a parity problem but determines that no alert is needed. In various implementations, by sending an alert, the parity drift system 106 can facilitate remedying the identified parity problem. Additional detail regarding providing alerts for parity drift is provided below in connection with FIG. 5.

As noted above, FIG. 3 illustrates an architecture diagram of a reference cloud computing system and a target cloud computing system in accordance with one or more implementations. In particular, FIG. 3 shows how the parity drift system 106 operates via components of the reference cloud computing system 102 and the target cloud computing system 112 to determine instances of parity drift at the target cloud computing system 112.

Figure 3:
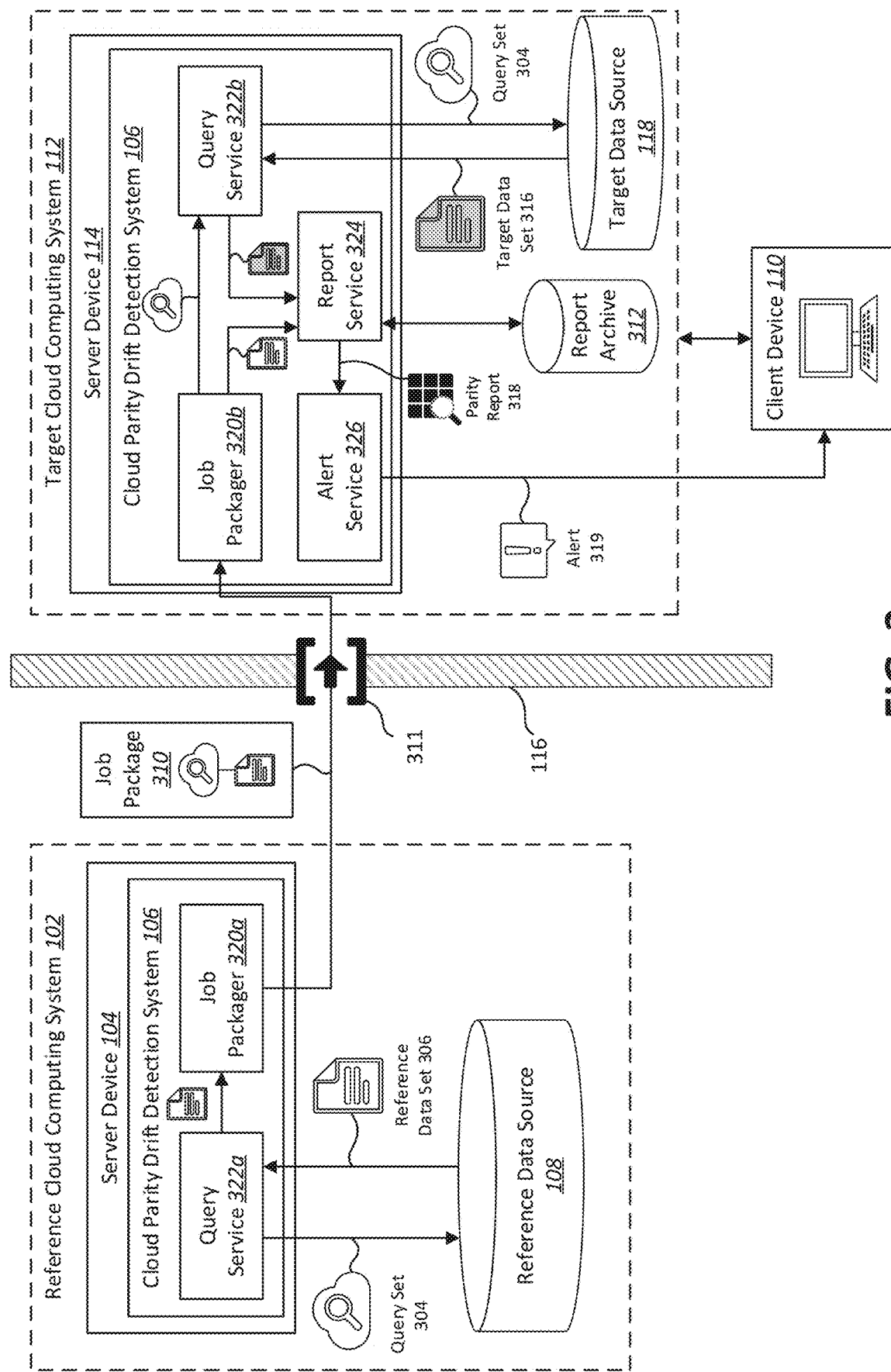
FIG. 3 illustrates an architecture diagram of a reference cloud computing system and a target cloud computing system in accordance with one or more implementations.

As shown, FIG. 3 includes various elements and components introduced in FIG. 1A above. For example, FIG. 3 includes the reference cloud computing system 102, the target cloud computing system 112, the client device 110, and the network wall 116. Further, FIG. 3 includes a network gateway device 311 that can restrict or prevent network traffic from entering or exiting the target cloud computing system 112.

As also shown, the parity drift system 106 (i.e., the cloud parity drift detection system) on the reference cloud computing system 102 includes a query service 322a and a job packager 320a. In some implementations, the query service 322a and the job packager 320a correspond to the query service manager 122 and the job package manager 120 described above in connection with FIG. 1B. Further, the parity drift system 106 on the target cloud computing system 112 includes a job packager 320b, a query service 322b, an alert service 326, and a report service 324. In one or more implementations, these components correspond to similar components described above and connect with FIG. 1B (e.g., the report service 324 corresponds with the report service manager 124).

In various implementations, the parity drift system 106 includes a collection of functions and services working together to create an event-based pipeline, which is represented by the arrows in FIG. 3. In some cases, each function in the pipeline is responsible for one or more transformations of the data.

As a high-level illustration, the parity drift system 106 on the reference cloud computing system 102 utilizes the query service 322a to execute onboarded queries (i.e., the query set 304) to obtain the reference data set 306, which gets replicated into each target cloud. Once replicated, the parity drift system 106 on the target cloud computing system 112 executes the equivalent query to produce the local data (e.g., the parity drift system 106 utilizes the query service 322b to execute the query set 304 to generate the target data set 316). In addition, the parity drift system 106 utilizes the report service 324 to compare the reference data set 306 and the target data set 316 to calculate a parity report 318 that includes parity dimensions and parity grades based on various parity settings and thresholds. Then, once the parity dimensions have been generated and grades have been assigned, the parity drift system 106 can utilize the alert service 326 to analyze the parity report and/or parity grades and notify the client device 110 (e.g., via an alert 319) in accordance with on alert policies.

In various implementations, the parity drift system 106 accesses, generates, and/or onboards various configurations (e.g., a configuration file) for generating parity drift in a target cloud computing system. In one or more implementations, the parity drift system 106 identifies and/or onboards one or more configuration files that maintain configurations for aspects of the parity drift system 106. For example, the configuration file is created during on onboarding stage and provided to the parity drift system 106. In some implementations, it is stored within each cloud computing system. In example implementations, a configuration file is a JSON file that can be validated against a schema. In various implementations, the configuration file can be stored as other file types.

In some implementations, the configuration file includes various configuration options (e.g., report configurations 140, parity grade configurations 142, and/or alert configurations 144). For example, the configuration file includes a query configuration having queries (i.e., a query set) and supporting metadata (e.g., connection information), a list of complementary report services and/or alert services, cloud-specific overriding settings, and/or inputs for the query. In some instances, a query will be invoked once for each input.

Additionally, the configuration file includes reporting configurations that indicate grade and/or parity dimension thresholds, other overrides, complementary report services, custom-grade definitions, and/or references to other grades with configurable weights. In various implementations, the configuration file includes an alerting configuration having alert policies and/or complementary alert services.

Additional detail will now be provided regarding components and services of the parity drift system 106. For example, with regard to the query service 322a (e.g., a public query service) on the reference cloud computing system 102, in one or more implementations, the query service 322a is responsible for communicating with the reference data source 108 to obtain data to be processed (e.g., the reference data set 306). For instance, query service 322a provides the query set 304 to the reference data source 108. In certain implementations, the reference data source 108 is a KQL database or another type of structured database that facilitates query requests.

In various implementations, the query set 304 includes configuration settings such that the response to the query set 304 conforms to input schemas familiar to each of the report services and the alert services. To elaborate, if a first report engine requires Columns A and B while a second report engine requires Columns B and C, then the query must result in Columns A, B, and C.

In some implementations, once the query service 322a gets the reference data set 306, it can validate it against the input schemas. For instance, schemas exported by the report services and the alert services can be used to validate data in the reference data set 306. In this manner, the parity drift system 106 can enforce that queried data in the reference data set 306 will conform to the appropriate services and engines as well as reduce runtime errors through pre-validation. Moreover, in various implementations, the reference data set includes a schema indicating state information and/or version information of network functions on the reference cloud system (without including user data stored on the reference cloud system).

In some implementations, upon validating the reference data set 306 against the input schemas, the parity drift system 106 can create a job package 310. For example, the parity drift system 106 creates a job package as a folder and/or a file named based on the query and a date and/or time (e.g., the current date and/or time). Further, the query service 322a can place the output file (e.g., reference data set 306) in the job package 310 along with the query set 304 and/or query configuration.

As mentioned above, the parity drift system 106 sends the job package 310 from the reference cloud computing system 102 to the target cloud computing system 112. In various implementations, the parity drift system 106 utilizes a replication service (e.g., part of the job packager 320a) to send the job package 310. For example, the parity drift system 106 uses a replication and duplication service to provide the job package 310 to the target cloud computing system 112.

In some implementations, the replication service may be critical to ensure that the job package 310 securely arrives at the target cloud computing system 112. For instance, in the case that the target cloud computing system 112 is an air-gapped cloud system or another restricted cloud system, the replication service facilities a secure delivery despite having only one-way or restricted communication channels. For example, a replication service on the reference cloud computing system 102 generates a manifest of files and hashes to be sent along with the query set 304 and the reference data set 306. Then, on the target cloud computing system 112, a corresponding replication service (e.g., part of the job packager 320b) receives the transmission and utilizes the manifest and hashes to ensure all files have been replicated without errors As shown in FIG. 3, the job package 310 is provided to the target cloud computing system 112 through the network wall 116. For example, a replication service utilizes encrypted one-way communications through a network gateway device 311 to provide the job package 310 to a corresponding replication service on the target cloud computing system 112. For instance, the job packager 320b on the target cloud computing system 112 can receive the job package 310 as well as unpack and store the query set 304 (e.g., a query configuration file) and the reference data set 306 indicating configuration settings of the reference cloud computing system 102. In some implementations, the job package 310 is sent to the target cloud computing system 112 utilizing an offline process.

As shown, the target cloud computing system 112 includes the query service 322b. Once the job packager 320b receives the job package 310, the query service 322b can consume the same query set 304 (e.g., query configuration)

and use it to generate the target data set 316. As noted above, the target data set can include a schema indicating state information and/or version information of network functions on the target cloud system (without including user data).

In various implementations, by providing a replication of the query set 304 along with the reference data set 306, the query service 322b ensures that the exact same query configuration is used to generate the target data set 316. Accordingly, in the case that a query was altered on the reference cloud computing system 102 (e.g., a new column was added), the parity drift system 106 does not have to wait for the updated query to be deployed in an update to the target cloud computing system 112 or risk running divergent queries, as was the case with existing systems (e.g., services largely deploy and replicate independent from each other, diverge, and often become out of sync). Rather, the most-recent query configuration is replicated and available for use by the query service 322b.

In various implementations, once the query service 322b generates the target data set 316, the parity drift system 106 can store the target data set 316 in data set storage alongside the reference data set 306. In some implementations, the parity drift system 106 adds the target data set 316 to the job package 310 stored on the target cloud computing system 112. In many implementations, the query service 322b does not send the target data set 316 to the reference cloud computing system 102. In one implementation, the query service 322b sends the target data set 316 to the reference cloud computing system 102 or to another computing device.

As shown, the target cloud computing system 112 includes the report service 324. In various implementations, the report service 324 obtains the generated data sets (e.g., the reference data set 306 and the target data set 316). In some implementations, the parity drift system 106 notifies the report service 324 when the reference data set 306 and the target data set 316 become available. In some implementations, the report service 324 sends a request to the data set storage on the target cloud computing system 112 to determine when both data sets are available. For example, the report service 324 monitors the data set storage for file creation events indicating when both the data sets have been created.

In one or more implementations, the report service 324 ingests the data sets and begins generating a parity report 318. In some implementations, the report service 324 performs transformations on one or more of the data sets (or creates a new file, columns, table, or data set that includes the transformations). For example, the report service 324 generates a set of "parity dimension" columns that indicate instances and magnitudes of parity drift among different services, features, and functions of the cloud computing systems. In some instances, the report service 324 generates one or more columns per service, feature, or function.

In various implementations, the report service 324 represents multiple report services or report engines that compare different corresponding portions of the data sets. For example, in implementations where multiple reports engines are utilized, the report service 324 can orchestrate a processing flow so that the report engines can transform the data sets one at a time. In additional implementations, the report service 324 enables the output of one report engine to be passed and/or utilized by a subsequent report engine.

In some implementations, a parity dimension represents a column that was calculated using a set of input columns from both the reference data set 306 and the target data set 316. In one or more implementations, a set of default report engines is utilized to calculate multiple dimensions. In various implementations, customized report engines calculate particular dimensions corresponding to particular services, features, and functions of the cloud computing systems. For example, the report service 324 utilizes complex, customized report engines to process critical services of the cloud computing systems.

To illustrate, in one or more implementations, the report service 324 can utilize a default set of report engines including a distance report engine that indicates the difference between corresponding values in the reference data set 306 and the target data set 316 (e.g., the difference between version labels, which can be represented as integers), a freshness report engine that indicates the time since the last target cloud system deployment (e.g., regardless of the reference cloud system deployment date), a deployment time report engine that indicates the number of deployments in the reference cloud computing system 102 since the last corresponding deployment in the target cloud computing system 112, and/or an age report engine that indicates the time since the reference cloud computing system 102 has moved on from the value on the target cloud computing system 112.

By way of example of the report service 324 utilizing a deployment time report engine, consider the following scenario. On 10/23, Service A on the target cloud system was at Version A. The reference cloud system upgraded from Version A to Version B on 10/20, to Version C on 10/22, and to Version D on 10/23. Therefore, as illustrated in Table 1 below, on 10/23, the "Total Deployments Since" value is 3 because there are 3 (e.g., DD+3) unique build labels in the reference cloud system between 10/20 and 10/23 (e.g., Versions B, C, and D).

TABLE 1 for Service A

| | Reference Cloud | | Target Cloud | | Total |
|---|---|---|---|---|---|
| Date | Deployment Date (DD) | Version | Deployment Date (DD) | Version | Deployments Since |
| 10/18 | 10/01 | A | 10/15 | A | 0 (DD) |
| 10/19 | 10/01 | A | 10/15 | A | 0 (DD) |
| 10/20 | 10/20 | B | 10/15 | A | 1 (DD + 1) |
| 10/21 | 10/20 | B | 10/15 | A | 1 (DD + 1) |
| 10/22 | 10/22 | C | 10/15 | A | 2 (DD + 2) |
| 10/23 | 10/23 | D | 10/15 | A | 3 (DD + 3) |
| 10/24 | 10/23 | D | 10/24 | D | 0 (DD) |

After the report service 324 generates the parity dimensions, the report service 324 can also generate parity grades (e.g., parity scores). In some implementations, the report service 324 supplements the parity report 318 with a set of "grade" columns corresponding to the parity columns. In one or more implementations, the report service 324 utilizes parity grade configurations to obtain grade thresholds used to determine parity grades. For example, the parity grade configurations include general parity grade thresholds as well parity grade thresholds for particular services, features, and functions. In various implementations, the report service 324 determines parity grades based on the values (e.g., grading criteria) supplied of each parity dimension in the parity grade configurations.

To illustrate, the Distance And Weighed Grade Grading Listing shown below provides an example grading criteria for a parity dimension having values generated by a distance report engine.

```
"Grade Distance": {
    "dimension": "Dimension_Distance"
    // GREEN (within 5 versions out of date)
    "GREEN": {
        "minimum": "",
        "maximum": "5"
    }
    // YELLOW (within 6-10 versions out of date)
    "YELLOW": {
        "minimum": "6",
        "maximum": "10"
    }
    // RED (11+ versions out of date)
    "RED": {
        "minimum": "11",
        "maximum": ""
    }
}
"custom_grades": [
    "weighted_grade": {
        "output_column": "Grade_Overall",
        "weights": {
            "Grade_DeploymentFreshness": "0.25",
            "Grade_DeploymentDistance": "0.75"
        }
    }
]
```

Distance Grading and Weighed Grade Listing

As shown in the listing above, the report service 324 assigns a "green" grade to services, features, or functions with a distance parity dimension value within 6 versions, a "yellow" grade to those with a distance parity dimension value between 5-10 versions, and a "red" grade to those with a distance parity dimension value above 11 versions out of date (i.e., green being good and red being bad). In some implementations, the above listing includes customizing grades by weighting different combinations of grades within an overall grade for a service, feature, or function.

In some implementations, the report service 324 provides the parity report 318 in a finalized form to a report archive 312, which can be a storage container, and/or provides (e.g., uploads) the parity report 318 to a structured database to facilitate programmatic access (e.g., query calls).

As noted above, the report service 324 can include multiple report engines. In some implementations, a report engine is a cloud computing system function that ingests file data according to a specified input schema and exports a report conforming to a specific output schema. In some instances, the report service 324 adds one or more columns of report information to an existing table.

In additional implementations, report engines can declare a set of parity dimensions. Further, report engines can chain their output to the input of other report engines so that one or more of the report engines can be re-used and composed to generate a final report.

Below is a listing that includes an example schema for a report engine that the parity drift system 106 can execute.

```
{
    "schema": "ReportEngine@1"
    "input_columns": {
        "<input-column-1>": "<regex-validation>",
        // ...
        "<input-column-N>": "<regex-validation>"
    }
    "output_columns": {
        "<output-column-1>": "<regex-validation>",
        // ...
        "<output-column-N>": "<regex-validation>"
    }
    "dimensions": {
        "<dimension-column-1>": {
            "type": "operand",
            "operation": "<add/substract/multiply/divide for integers and datetime>",
            "operand_left": "<$public|$local>.< column-name>",
            "operand_right": "<$public|$local>.< column-name>"
        },
        ...,
        "<dimension-column-N>": {
            "type": "function",
            "operation": "<azure-function-name>"
        }
    }
    "grade": {
        "schema": "grades@1"
        // Break the dimensions into ranges, assign each range a grade
        "grades": {
            "<grade-column-1>": {
                "dimension": "<input-dimension>"
                "<grade-value-1>": {
                    "minimum": "<minimum-dimension-range>"
                    "maximum": "<maximum-dimension-range>"
                },
                // ...
                "<grade-value-N>": {
                    "minimum": "<minimum-dimension-range>",
                    "maximum": "<maximum-dimension-range>"
                }
            },
```

```
            // ...
            "<grade-column-N": {
                ...
            }
        }
    }
}
```

Report Engine Schema Engine 10

Additionally, the below listing provides an example report engine that computes a "Distance" and "Freshness" parity dimension along with associated parity grades based on a "Red/Yellow/Green" grading schema.

```
{
    "schema": "ReportEngine@1"
    "input_columns": {
        // YYYY-MM-DD
        "Deployment_Date_UTC": "[0-9]{4}\-[0-9]{2}\-[0-9]{2}"
        "Version_Numeric": "[0-9]+"
    "output_columns": {
        "Dimension_Distance": "[0-9]+" // in Days
        "Grade_Distance": ".+" // Grade
        "Dimension_Freshness": "[0-9]+" // in Days
        "Grade Freshness": ".+" // Grade
    }
    "dimensions": {
        "Dimension_Freshness": {
            "type": "operand",
            "operation": "DateTime.Subtract",
            "operand_left": "Datime.UTCNow( )",
            "operand_right": "$local.Deployment_Date_UTC"
        },
        "Dimension_Distance": {
            "type": "operand"
            "operation": "subtract"
            "operand_left": "$public.Version_Numeric"
            "operand_right": "$local.Version_Numeric"
        },
        "Dimension_Age": {
            "type": "function",
            "operation": "calculate_deployment_age" // Azure Function
        },
        "Dimension_TotalDeploymentsSince": {
            "type": "function",
            "operation": "calculate_total_deployments_since" // Azure Function
        }
    }
    "grade": {
        "schema": "grades@1"
        "grades": {
            "Grade_Freshness": {
                "dimension": "Dimension_Freshness"
                // -INF -> 30 == GREEN
                "GREEN": {
                    "minimum": "",
                    "maximum": "30"
                }
                // 31-60 == YELLOW
                "YELLOW": {
                    "minimum": "31",
                    "maximum": "60"
                }
                // 61+ == RED
                "RED": {
                    "minimum": "61",
                    "maximum": ""
                }
            },
```

// For this Grade, it's recommended the query owner normalize their query to make sense for these threshold values
// For example, if there are multiple build label formats, each format may have a different way they must be normalized to make sense for these thresholds

```
"Grade_Distance": {
    "dimension": "Dimension_Distance"
    // GREEN (within 5 versions)
    "GREEN":{
        "minimum": "",
        "maximum": "5"
    }
    // YELLOW (within 5-10 versions)
    "YELLOW": {
        "minimum": "6",
        "maximum": "10"
    }
    // RED (11+ versions out of date)
    "RED": {
        "minimum": "11"
        "maximum". ""
    }
    }
    }
}
}
```

Distance and Freshness Report Engine

As shown, the target cloud computing system 112 includes the alert service 326. In various implementations, the alert service 326 provides alerts based on grades. For example, the alert service 326 takes the grades in the parity report 318 and disseminates alerts to one or more computing devices for each grade that matches an alerting condition. In some implementations, the alert service 326 traverses through each row in the parity report 318 and compares the values therein to corresponding alert policies (e.g., grading policies and grading thresholds). Additionally, the alert service 326 can provide alerts for each triggered alert policy.

In certain implementations, unlike the report service 324, which runs in a serial chain, the alert service 326 can run in parallel. In this manner, multiple alert engines can concurrently analyze the parity report 318 to determine when corresponding rows contain parity grades that trigger actions associated with an alerting policy.

In various implementations, the alert service 326 prioritizes alerts based on specificity, importance, and/or severity. For instance, the alert service 326 holds one or more alerts to be sent. In some implementations, the alert service 326 provides the most critical alerts first. In various implementations, the alert service 326 provides the most specific alerts first. Indeed, in one or more implementations, the alert actions can be defined and/or specified within a set of configurable alert policies (e.g., the alert configurations), such as included in the onboarded configuration file, described above.

The Alert Policy Listing shown below provides an example of an alert policy.

```
"alert_policies": [
{
    // if weighted grade is RED: raise sev2
    "condition": "any"
    "grades": [
```

```
    "Grade_Overall"
    ],
    "policy": {
        "RED": "sev2"
    }
},
{
    // else if all grades are YELLOW: raise sev3
    "condition": "all",
    "grades": [
        "Grade_DeploymentFreshness",
        "Grade_DeploymentDistance"
    ],
    "policy": {
        "YELLOW": "sev3"
    }
},
{
    // else if any specified grade is Yellow -> sev4,
    // or if any specified grade is RED -> sev3
    "condition": "any"
    "grades": [
        "Grade_DeploymentFreshness",
        "Grade_DeploymentDistance"
    ],
    "policy": {
        "YELLOW": "sev4"
        "RED": "sev3"
    }
    }
]
```

Alert Policy Listing

In the alert policy listing shown above, the alert service 326 provides various alerts based on various parity grades or scores (e.g., parity grades) satisfying grading conditions. For example, if the weighted grade for any service, feature, or function is red, an alert is sent. If all grades are yellow, then a different alert is sent, which can be the same alert for a non-weighted red grade. Further, for a specified yellow grade, a still different alert is sent.

In various implementations, the parity drift system 106 provides alerts directly to computing devices. In some implementations, the parity drift system 106 utilizes a third-party service to send out alerts (e.g., an alert 319). For example, the target data set 316 utilizes an incident management (IcM) alert engine or another type of alert system to manage alert delivery of the alert 319 to an end-user computing device.

In various implementations, the alert service 326 (i.e., the parity drift system 106) provides an alert 319 to the client device 110 such that a cloud system administrator (or another authorized user) is notified of the one or more instances of parity drift. In various implementations, an alert 319 is preferable to taking automatic action as the administrator is in a better position to determine whether to remedy a particular instance of parity drift. For example, upgrading a service to the most recent version that matches the corresponding service on the reference cloud system may cause compatibility issues or problems on the target cloud system and the administrator may elect to forgo the upgrade for now. However, by being notified of the instances of parity drift on the target cloud system, the administrator can be prepared and appropriately respond to the determined instances of parity drift.

In some implementations, the alert 319 triggers an automatic upgrade of a service (or feature or function). For example, if the alert 319 corresponds to a critical security patch or update that patches a zero-day vulnerability, the parity drift system 106 may respond to the alert 319 by automatically upgrading the service that is out of parity to bring it into parity with the reference cloud system. In various implementations, the parity drift system 106 automatically remedies the parity drift at the target cloud system and the alert 319 indicates that an instance of parity drift has been upgraded to match the corresponding service on the reference cloud system.

In one or more implementations, the alert 319 indicates multiple instances of parity drift on the target reference cloud system. For example, the alert 319 is a parity drift report (or links to a report) that indicates different instances of parity drift. In these implementations, the parity drift report sorts the instances of parity drift by magnitudes (e.g., green, yellow, or red services). In certain implementations, the alert 319 provides links to quickly remedy one or more instances of parity drift. For instance, the alert 319 provides a link to initiate, download, or schedule an upgrade of a service that is out of parity with the reference cloud system.

In various implementations, the client device 110 allows for modification of the alert 319. For example, the client device 110 provides input to the parity drift system 106 that pauses, mutes, and/or snoozes one or more instances of parity drift from future alerts. In example implementations, the client device 110 provides input that disables alerts for particular services. In some implementations, the client device 110 provides input to customize alerts for particular services. For instance, the parity drift system 106 receives input to not provide an alert for a particular service until a set of conditions is satisfied (e.g., based on alert levels and timing).

Figure 4B:
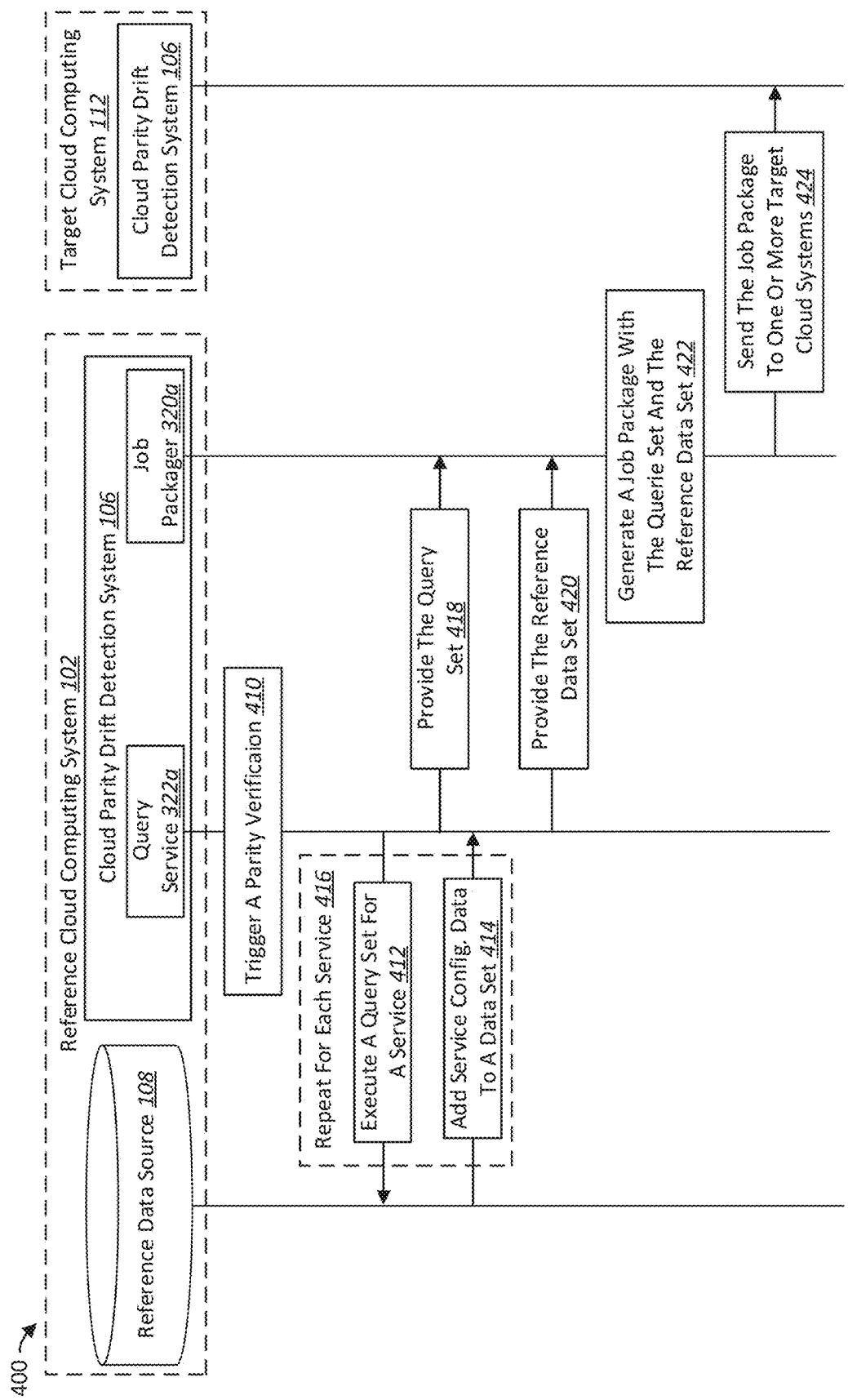
Figure 4C:
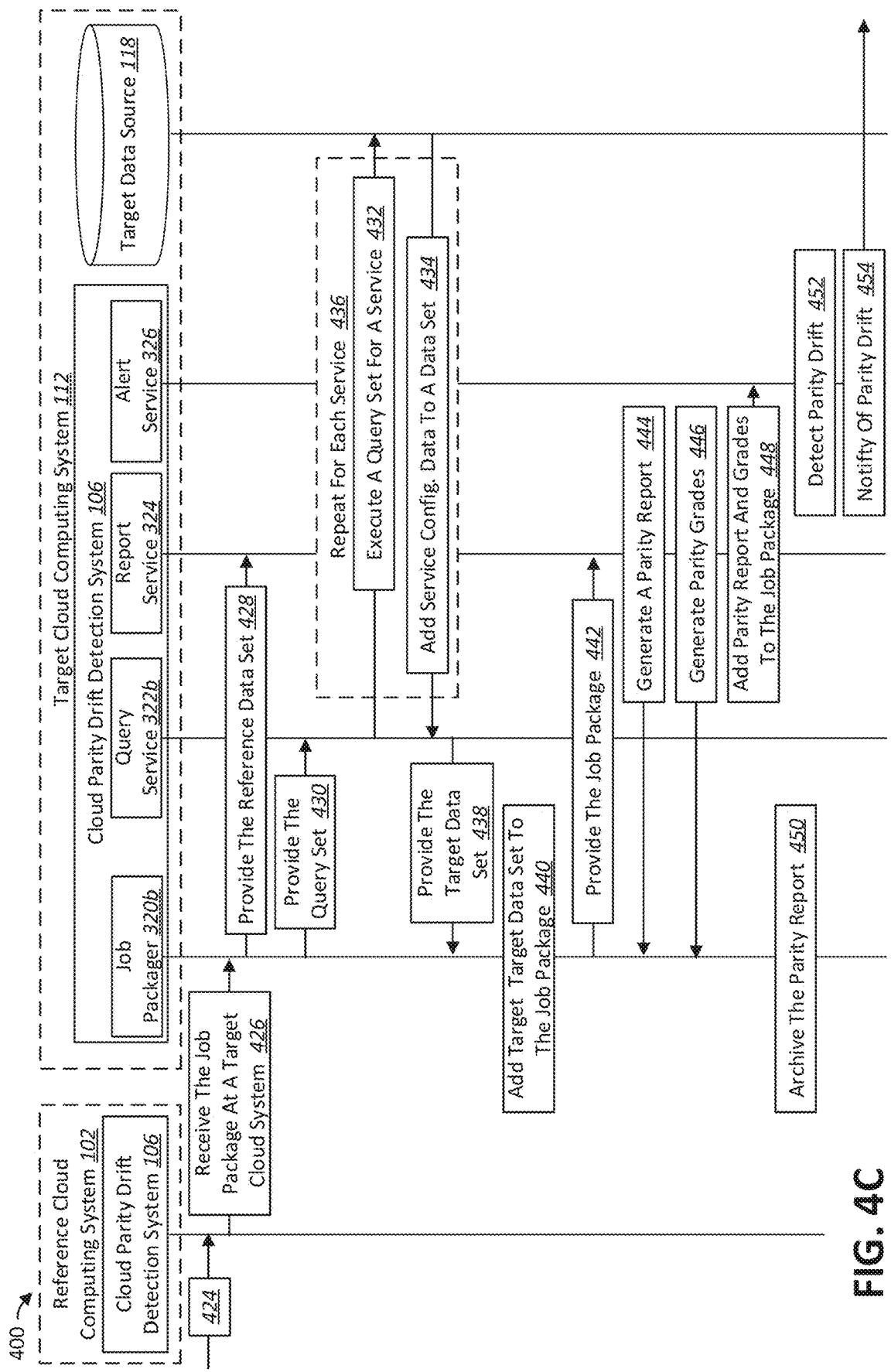

Turning now to FIGS. 4A-4C, additional detail is provided regarding detecting instances of parity drift on the target cloud computing system. In particular, FIGS. 4A-4C illustrate a sequence flow diagram that shows the timing and actions between various components of the parity drift system 106 to determine instances of parity drift at the target cloud system.

As shown, FIGS. 4A-4C illustrate a series of acts 400 performed by the parity drift system 106. (e.g., components of the parity drift system 106). In particular, FIG. 4A illustrates a high-level overview of the series of acts 400 and includes the parity drift system 106 operating on the reference cloud computing system 102 and the target cloud computing system 112.

Additionally, FIG. 4A shows portions of the series of acts 400 that first occur on the reference cloud computing system 102 followed by portions of the series of acts 400 that occur on the target cloud computing system 112. Accordingly, as shown, the series of acts 400 includes an act 402 of generating a reference cloud data set to verify parity with one or more target cloud computing systems. The act 402 is further described in connection with FIG. 4B, described below. Additionally, the series of acts 400 includes an act 404 of determining instances of parity drift on the target cloud system, which is further described in connection with FIG. 4C.

While this disclosure primarily describes the parity drift system 106 determining parity drift within the target cloud system, in one or more implementations, the reference cloud system may determine instances of parity drift occurring on the target cloud system. For example, the parity drift system 106 generates the target data set on the target cloud computing system 112 and provides a job package of the target data set and the query set to the reference cloud computing system 102. Then, the parity drift system 106 on the reference cloud computing system 102 performs the functions of the report service and the alert service to determine and notify of instances of parity drift at the target cloud computing system 112.

In some implementations, the parity drift system 106 is located on another computing device and determines instances of parity drift that occur on the target cloud system based on receiving data sets from both the reference cloud system and the target cloud system. In these implementations. The parity drift system 106 may continue to use a job package that includes at least the query set to ensure that both the reference cloud system and the target cloud system are using the same query set to generate their respective data sets.

As mentioned above, FIG. 4B corresponds to the act 402 and the parity drift system 106 generating a reference cloud data set. As shown, the reference cloud computing system 102 in FIG. 4B includes the reference data source 108 and the parity drift system 106. In particular, the parity drift system 106 in FIG. 4B includes the query service 322a and the job packager 320a introduced above.

As shown in FIG. 4B, the series of acts 400 includes an act 410 of triggering a parity verification. For example, in various implementations, the query service 322a includes a scheduler or timer that triggers or initiates the parity verification process. For instance, the schedule runs a regular (e.g., hourly, daily, weekly, etc.) event (e.g., a cron job or script) that initiates the parity verification process. In one or more implementations, the query service 322a triggers a parity verification based on receiving user input (e.g., via an HTTP trigger-based execution). In some implementations, the scheduler triggers different query sets at different times that check for parity drift in different portions of a cloud computing system.

In one or more implementations, the query service 322a retrieves a query set from a storage container or a storage device as part of initiating the parity verification process. For example, as part of onboarding, one or more query sets are added to a storage container from which the query service 322a can be retrieved. In some implementations, the query set includes a query configuration file having one or more queries.

As shown, the series of acts 400 includes an act 412 of executing a query set for a service (or a function or a feature) as well as an act 414 of adding service configuration data to a data set. In various implementations, the query service 322a provides a query to the reference data source 108 to retrieve one or more inputs which are returned to the query service 322a. As shown in the series of acts 400 as act 416, the query service 322a can repeat (e.g., loop) the query search for each service being accessed according to the query set and/or query configuration. In this manner, the query service 322a can generate a reference data set, as further described above.

As shown, the series of acts 400 includes an act 418 of providing the query set to the job packager 320a. For example, in various implementations, upon receiving or accessing the query set, the query service 322a provides a copy of the query set to the job packager 320a to include in a job package. In addition, the series of acts 400 includes an act 420 of providing the reference data set to the job packager 320a.

As shown, the series of acts 400 includes an act 422 of generating a job package with the query set and the reference data set. For instance, in multiple implementations, the job packager 320a generates a job package that includes the query set and the reference data set. In some implementations, the job package also includes metadata or other information that distinguishes the job package from other job packages. For example, the job packager 320*a* includes information regarding the date and/or time the job package was created and/or if the job package is particular to a group of services.

As shown, the series of acts 400 includes an act 424 of sending the job package to one or more target cloud systems, such as the target cloud computing system 112. Indeed, the reference cloud system can send the job package to serve as a truth set for other cloud systems to be modeled after and/or used to detect parity drift. In various implementations, the parity drift system 106 sends the job package to a single target cloud system. In other implementations, the parity drift system sends the job package to multiple cloud target cloud systems. In various implementations, a target cloud computing system is an on-premises cloud computing system operated by a different entity than operates the reference cloud computing system. In example implementations, a target cloud computing system is an air-gapped cloud computing system. In some implementations, a target cloud computing system includes a cloud computing system operated by a competing cloud computing system provider.

In some implementations, the parity drift system 106 uses a replication service or another type of transmission service to provide the job packet to a target cloud system. In various implementations, the parity drift system 106 sends the job packet via an encrypted channel or another type of secure communication channel. According to some implementations, the target cloud computing system 112 requests or pulls a job package from the reference cloud computing system 102.

As shown in FIG. 4C, the series of acts 400 includes an act 426 of receiving the job packet at a target cloud system. As shown in FIG. 4C, the target cloud computing system 112 includes the target data source 118 and the parity drift system 106. As also shown, the parity drift system 106 includes the job packager 320*b*, the query service 322*b*, the report service 324, and the alert service 326. In various implementations, the act 426 includes receiving a copy of the job packet from the reference cloud computing system 102.'

As further shown in FIG. 4C, the series of acts 400 includes an act 428 of providing the reference data set to the report service 324. For example, the job packager 320*b* provides the reference data set from received in the job packet to the report service 324. In some implementations, the job packager 320*b* performs one or more validation functions to confirm receipt of a valid job package. For example, the job packager 320*b* utilizes hashes and/or metadata in a newly received job package to confirm that data within the job package is not corrupted or compromised.

As illustrated, the series of acts 400 includes an act 430 of providing the query set to the query service 322*b*. For example, the job packager 320*b* provides the query set or a copy of the query set, including query configurations, to the query service 322*b*. In this manner, the query service 322*b* can utilize the query set to construct an equivalent data set on the target cloud system as was done on the reference cloud system.

To illustrate, the series of acts 400 includes an act 432 of executing a query set for a service (or feature or function) as well as an act 434 of adding service configuration data to a data set. For example, the query set 322*b* sends queries to the target data source 118 for one or more inputs and includes the requested configuration data in a target data set. In various implementations, the parity drift system 106 draws from equivalent data source files on the target cloud system as was done on the reference cloud system. In this manner, the reference data set and the target data set are compatible and comparable. As shown, the act 432 and the act 434 can be repeated for each query (e.g., for each requested input) from the query set, which is shown as the act 436.

Additionally, as noted previously, the data sets of the cloud systems do not include user-based data. Rather the data sets include system-based data. In this manner, the parity drift system 106 focuses on the configuration and operational issues of a cloud system rather than what data is stored by the cloud system.

As shown, the series of acts 400 includes an act 438 of providing the target data set to the job packager 320*b*. In one or more implementations, the query service 322*b* generates and provides the target data set to the job packager 320*b*. The job packager 320*b* can supplement the received job package with the target data set, which is shown as act 440 of the series of acts 400. In some implementations, the parity drift system 106 may store the target data set in a storage container associated with the target cloud computing system 112.

As shown, the series of acts 400 includes an act 442 of providing the job package to the report service 324 on the target cloud computing system 112. For example, in various implementations, the job packager 320*b* provides the job package, a link, or an indication of the job package to the report service 324. In some implementations, a storage event-based trigger notifies the report service 324 that both data sets are available. In other implementations, the report service 324 can detect when the target data set has been added to the job package along with the reference data set (e.g., the report service 324 is triggered when the two data sets show up).

As noted above, in various implementations, the report service 324 is a collection of report engines that compare and analyze vectors of data between the two data sets. For example, a report engine can compare one column of data in the reference data set with a corresponding column of data in the target data set according to a schema established by the report engine. Further, the report service 324 can walk through a list of report engines and invoke each engine, as described above.

To elaborate, for each report engine, the report service 324 can access the data sets, utilize a report engine schema to identify the appropriate columns in the data sets that serve as inputs for the report engine and execute calculations to generate an output (e.g., parity dimensions of a service, feature, or function). Indeed, the report service 324 generates the output according to the report engine schema. For example, the report service 324 generates a parity report that includes new columns of vector data, which indicate various parity dimensions. In some implementations, the report service 324 generates the parity report as part of one or both of the data sets, or as a new data structure.

As mentioned above, the report service 324 can process various report engines in a chain or serial manner such that the output of previous report engines can serve as input to subsequent report engines. In some implementations, the report service 324 executes different report engines in parallel. Accordingly, as shown, the series of acts 400 includes an act 444 of generating a parity report.

In various implementations, different report engines use the same schema. For example, many report engines use a default schema that indicates the input and output formats needed by the report engine. In some implementations, a report engine uses a customized schema that changes inputs, outputs, operation modes, and/or other formats of the report engine. For instance, in one or more implementations, a report engine is customized to perform complex calculations with respect to multiple columns from both the reference data set and the target data set. Indeed, in some implementations, the parity drift system 106 provides a generic schema for report engines while also offering customization options that target specific services, features, or functions. Indeed, in many instances, the parity drift system 106 allows for different services to be measured in reported differently.

In certain implementations, the report service 324 facilitates different parity dimensions to be reported for a service. For example, in one or more implementations, a parity dimension includes a simple binary parity metric that indicates whether a system (or a portion thereof (e.g., a service)) is or is not at parity (e.g., having the same versions, tools, or scripts). In some implementations, a parity dimension includes different configuration versions (e.g., differences in service configurations, dependency configurations (e.g., Geneva Logs configuration), ARM manifests, etc.). In various implementations, a parity dimension includes different environmental versions (e.g., differences in operating systems, patches, virtual machine extensions, shared services, etc.). Indeed, detecting parity drift can range from, on one end, detecting differences between two cloud systems to, on the other end, detecting differences between a specific flag of a service.

In example implementations, the parity drift system 106 utilizes time to further indicate a "distance" dimension for measuring parity drift (e.g., generating a parity dimension of a parity service in the parity report). For instance, the parity drift system 106 can measure a service having different configuration settings between the reference cloud system and the target cloud system over time, which adds a "distance" dimension that can then be measured via thresholds. For example, a service version may be "equal" one day and "not equal" the next day.

As shown, the series of acts 400 includes an act 446 of generating parity grades. In various implementations, the report service 324 compares parity dimensions in the parity report to grading policies and grading thresholds to determine parity grades for the services, features, and functions of the target cloud computing system 112, as described above. In one or more implementations, the report service 324 determines a parity grade based on more than one parity dimension in a parity report for a service, feature, or function of the target cloud computing system 112. Additionally, in some implementations, the parity grades are added to the parity report (e.g., as an additional column).

The parity drift system 106 can use various types of grading systems to indicate parity grades. For example, as described above, the parity drift system 106 can employ a red, yellow, green grading model that indicates good, questionable, and bad parity grades, respectively. In some instances, the parity drift system uses a number scale (e.g., 1-10, 1-100, etc.). According to other instances, the parity system uses a letter-grade system.

In one or more implementations, the report service 324 accesses archived job reports to determine trends of parity drift for a service by comparing how the service has drifted out of parity over a period of time. For example, if the report service 324 detects that parity drift for Service A is increasing over a period of time (e.g., a week, 15 days, a month, 3 months, etc.), then the report service 324 can determine something wrong with either deployments technologies or target technologies for Service A. Tracking trends of parity drift could also serve as a bellwether (e.g., an indicator or predictor) for the overall health of the target cloud system. For example, a parity drift trend could indicate deployment collisions for an upgrade that deploys to each node in the target cloud system that otherwise would go undetected. In this manner, the report service 324 can determine the urgency regarding the parity drift of a service. Indeed, in some implementations, the report service 324 may determine a more critical parity grade based on the parity drift pattern over time of a service. Likewise, the report service 324 may determine that the parity drift of a service is more likely an outlier event and thus, less critical, resulting in a less critical parity grade. Moreover, the report service 324 can utilize parity drift as a longer-term tool to measure parity drift trends and behaviors when developing tools and updates to cloud systems.

In various implementations, the parity drift system 106 provides default as well as customizable grading policies and grading thresholds for each service, function, and feature. In this manner, some services may warrant closer monitoring and greater sensitivity to parity drift (e.g., services associated with the security of the target cloud system) while other less-critical services may be able to experience instances of parity drift with little to no immediate consequence.

To further illustrate, some services deploy on a very frequent basis, such as multiple times a week, while other services may deploy updates a few times a year. Accordingly, the parity drift system 106 allows for using different grading thresholds to determine parity drift for these different services as a 30-day drift for one service (e.g., the frequently updated service) indicates a much more critical parity drift than a 30-day drift for another service (e.g., the seldomly updated service).

Additionally, in various implementations, the parity drift system 106 allows for user customizations and modifications of parity grading policies and thresholds. For example, the parity drift system 106 facilitates user input to increase or decrease the grading sensitivity by increasing or decreasing the grading threshold for that service (e.g., decrease the number of days before a service is graded as critical or red). Indeed, the parity drift system 106 facilitates user input of generic and/or general policies to provide specific exemptions for particular services.

As shown, the series of acts 400 includes an act 448 of adding the parity report and grades to the job package. For instance, in one or more implementations, the report service 324 adds the parity report to the job package. In various embodiments, the report service 324 provides the parity report and/or parity grades to the job packager 320*b* and the job packager 320*b* appends or supplements the job package with the report (including the parity grades for each service, feature, and function of the target cloud computing system 112).

As shown, the series of acts 400 includes an act 450 of archiving the parity report. For instance, in various implementations, the job packager 320*b* stores the parity report in an indexable format that facilitates easy and more efficient query retrieval of past parity drift information of the target cloud computing system 112. In some instances, parity reports are archived in a structured database, as described above.

As shown, the series of acts 400 includes an act 452 of detecting parity drift by the alert service 326. For instance, in various implementations, the alert service 326 of the parity drift system 106 detects one or more instances of parity drift based on parity grades within the parity report.

For example, if a parity grade of a service triggers an alert threshold (e.g., Service A has a red grade), then the alert service 326 can send out a corresponding alert. As another example, if a set of services have parity grades that trigger an alert threshold (e.g., five services have yellow grades), then the alert service 326 can send out the same or a different alert. Examples of parity alerts and alert thresholds are provided above.

Further, in various implementations, the parity drift system 106 implements a simplified alert detection system, as the complex computations are often performed by the report service 324 (e.g., at the parity reporting and/or grading level). Thus, in many implementations, the alert service 326 can follow a simplified set of alert thresholds to determine when to send out an alert, which types of alerts to send, and to which computing devices to send alerts. Accordingly, the series of acts 400 includes an act 454 of notifying of parity drift (e.g., providing alerts indicating instances of parity drift on the target cloud system to a client device).

In some implementations, however, the parity drift system 106 can customize alerts based on specific services, features, or functions. For example, the alert service 326 provides alerts for certain services having a given parity grade but not for other services having the same given parity grade. As noted above, the parity drift system can account for this at the grading level in some instances. in other instances, the parity drift system facilitates this action at the alert level. Indeed, the parity drift system 106 can facilitate customizations to enable a user to specify at which level to apply one or more customizations.

In a similar manner, in one or more implementations, the parity drift system 106 can provide an alert when a combination of parity grades triggers an alert threshold. For example, the alert service 326 determines that a combination of related services has a combined parity grade score below an alert threshold (e.g., the sum of parity scores for the related services falls below a minimum alert threshold corresponding to the related services). Indeed, the parity drift system facilitates several types of alert policies and alert thresholds for sending alerts.

Turning to the next figure, FIG. 5 illustrates providing an indication of parity drift on a computing device in accordance with one or more implementations. As shown, FIG. 5 includes a computer device 500 having a graphical user interface 502. As also shown, the graphical user interface 502 includes an alert 504 that indicates an instance of parity drift on a target cloud system.

In various implementations, the alert 504 allows for user interaction. For example, as shown with the confirmation selectable element 506 (e.g., the "Okay" bottom), the alert 504 allows for a user to confirm receipt of the alert 504. In other instances, the alert 504 provides several different options. For instance, the alert 504 provides an option to have the parity drift system 106 automatically remedy the parity drift (e.g., update a service to the latest version). In another instance, the alert 504 provides information regarding how the parity drift can be resolved at the discretion of the user.

While the alert is shown as a graphical user interface, in many implementations, the alert is provided in different formats. For example, in some implementations, the alert is part of a parity drift report. In various implementations, the alert is included in a system log file. In other implementations, the alert is provided as an electronic message. Additional details regarding providing and reacting to alerts that indicate instances of parity drift at the target cloud system are provided above.

Figure 6A:
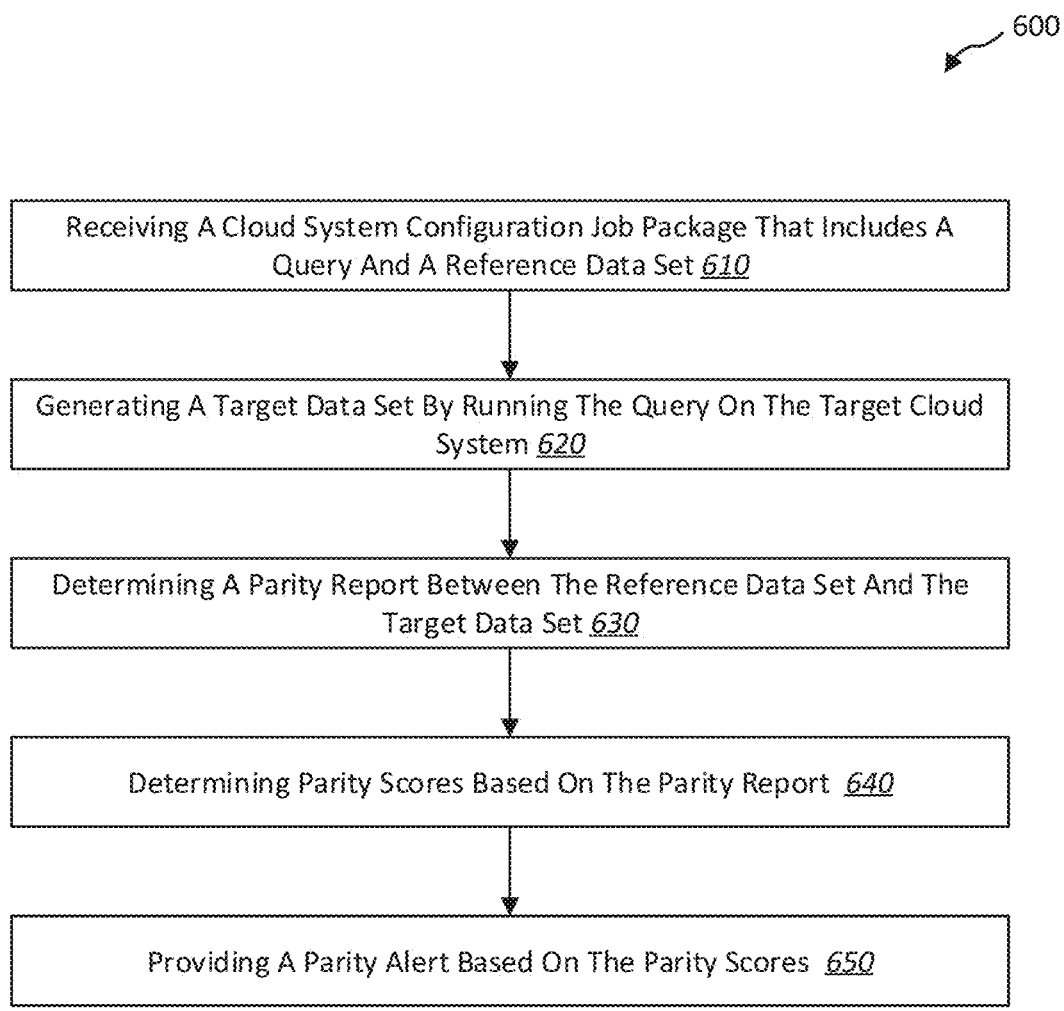
FIGS. 6A-6B illustrate example series of acts for determining parity drift for a target cloud computing system in accordance with one or more implementations.
Figure 6B:
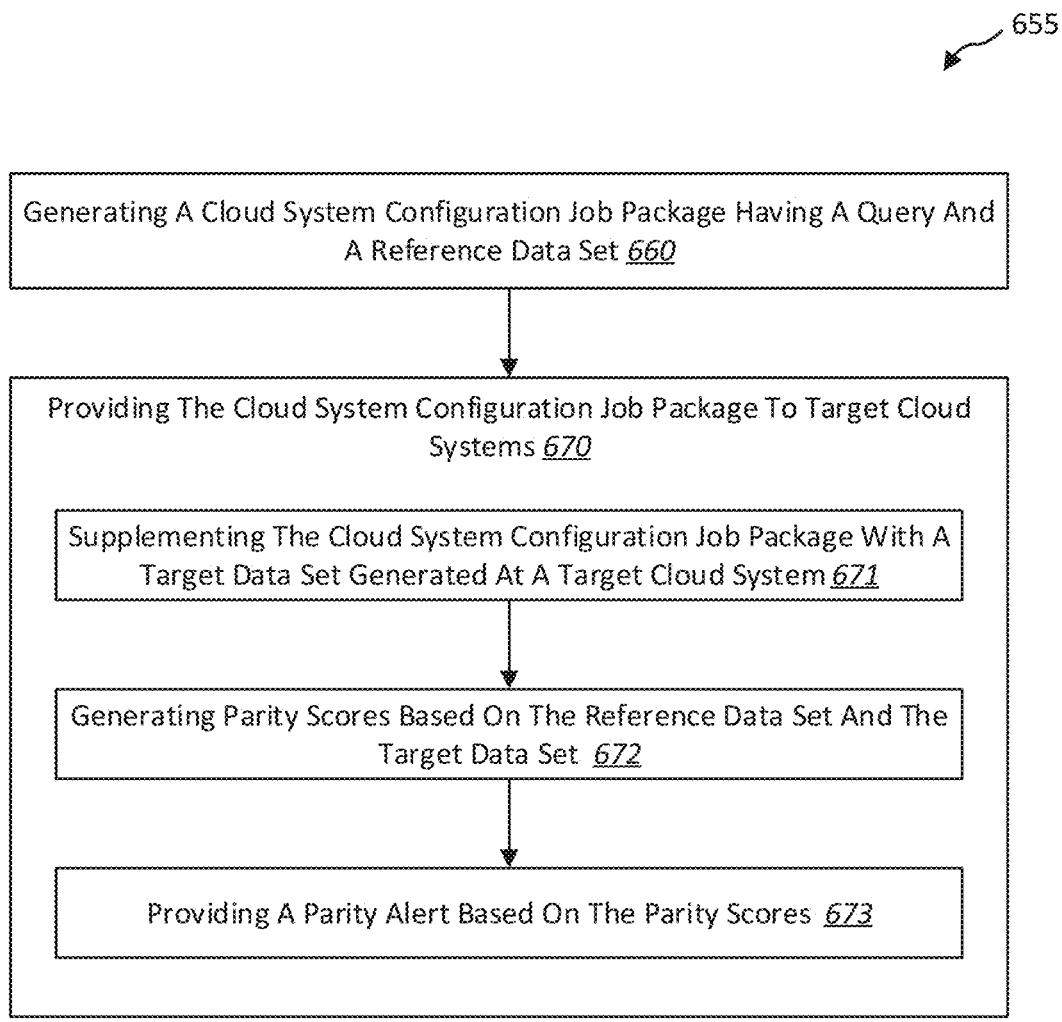

Turning now to FIGS. 6A-6B, these figure illustrates example flowcharts including series of acts 600, 655 for utilizing the parity drift system 106 in accordance with one or more implementations. While FIGS. 6A-6B illustrate acts according to one or more implementations, alternative implementations may omit, add to, reorder, and/or modify any of the acts shown. Further, the acts of FIGS. 6A-6B can be performed as part of a method. Alternatively, a non-transitory computer-readable medium can include instructions that, when executed by one or more processors, cause a computing device to perform the acts of FIGS. 6A-6B. In still further implementations, a system can perform the acts of FIGS. 6A-6B.

For example, FIG. 6A illustrates a series of acts 600 for determining parity drift for a target cloud computing system. The series of acts 600 includes an act 610 of receiving a cloud system configuration job package that includes a query and a reference data set. For instance, the act 610 may involve receiving, at a target cloud computing system and from a reference cloud computing system, a job package including a query set and a reference data set generated by running the query set on feature configurations of the reference cloud computing system.

In some implementations, the act 610 includes adding the target data set to the job package stored on the target cloud computing system in response to generating the target data set. In certain implementations, the reference data set includes a schema indicating state information and version information of network functions on the reference cloud computing system without including user data. Indeed, in example implementations, the reference data set includes control data while omitting user data. In one or more implementations, the act 610 includes receiving the job package via a one-way communication channel where return communication to the reference cloud computing system is prohibited, restricted, and/or otherwise limited.

As further shown, the series of acts 600 includes an act 620 of generating a target data set by running the query on the target cloud system. For example, the act 620 may involve generating a target data set by running the query set from the job package on the target cloud computing system in response to receiving the job package and at the target cloud computing system. In some implementations, the act 620 includes running the query set from the job package on feature configurations of services on the target cloud computing system.

As further shown, the series of acts 600 includes an act 630 of determining a parity report between the reference data set and the target data set. For example, the act 630 may include determining a parity dimension report between the reference data set and the target data set. In various implementations, the act 630 includes utilizing a plurality of report engines to determine a plurality of parity dimensions based on inputs from the reference data set and the target data set. In some implementations, the parity dimension report includes a table of columns including an output for each report engine executed.

As further shown, the series of acts 600 includes an act 640 of determining parity scores (e.g., parity grades) based on the parity report. For example, the act 640 may involve determining, at the target cloud computing system, parity scores based on the job package stored on the target cloud computing system including the query set, the reference data set, and the target data set. In some implementations, the act 640 includes determining parity scores based on the parity dimension report and one or more parity score thresholds.

In one or more implementations, the act 640 includes utilizing a plurality of report engines to determine a plurality of parity dimensions based on inputs from the reference data set and the target data set. In some implementations, the act 640 further includes generating a parity dimension report that includes a column for each of the plurality of parity dimensions.

In various implementations, the act 640 includes generating a parity dimension report between the reference data set and the target data set and determining one or more parity scores based on the parity dimension report and one or more parity score thresholds. In certain implementations, the act 640 further includes determining the parity dimension report between the reference data set and the target data set based on parity configuration settings of the target cloud computing system. In various implementations, in response to determining the parity scores, the act 640 includes adding the parity scores to the job package as well as archiving, on the target cloud computing system, the job package including the query set, the target data set, the reference data set, the parity dimension report, and the parity scores. In some implementations, the act 640 further includes determining one or more parity scores based on the reference data set, the target data set, and one or more archived job packages.

As further shown, the series of acts 600 includes an act 650 of providing a parity alert based on the parity scores. For example, the act 650 may include providing, by the target cloud computing system, one or more parity alerts based on the parity scores. In various implementations, the act 650 includes detecting, based on the parity scores, one or more feature configurations of the target cloud computing system that triggers a parity alert threshold. In some implementations, providing the one or more parity alerts is based on the parity alert threshold being triggered. In various implementations, the act 650 includes appending the one or more parity scores to the parity dimension report.

FIG. 6B also illustrates a series of acts 655 for determining parity drift for a target cloud computing system. The series of acts 655 includes an act 660 of generating a cloud system configuration job package having a query and a reference data set. For instance, the act 660 may involve generating, by a reference cloud computing system, a job package that includes a feature configuration query set and a reference data set generated by running the feature configuration query set on the reference cloud computing system.

As further shown, the series of acts 655 includes an act 670 of providing the cloud system configuration job package to the target cloud system. For example, the act 670 may include providing the job package to a plurality of target cloud computing systems. In various implementations, one of the target cloud computing systems is an on-premises cloud computing system operated by a different entity than operates the reference cloud computing system. In some implementations, the plurality of target cloud computing systems includes a cloud computing system operated by competing cloud computing system providers. In example implementations, the target cloud computing system is an air-gapped cloud computing system.

Further, as shown in FIG. 6B, the act includes various sub-acts. To illustrate, the act 670 includes a sub-act 671 of supplementing the cloud system configuration job package with a target data set generated at a target cloud system. For instance, the sub-act 671 may involve supplementing the job package with the target data set generated by running the feature configuration query set on the target cloud computing system.

As further shown, the act 670 includes a sub-act 672 of generating parity scores based on the reference data set and the target data set. For instance, the sub-act 672 may involve generating parity scores based on the supplemented job package including the query set, the reference data set, and the target data set.

As further shown, the act 670 includes a sub-act 673 of providing a parity alert based on the parity scores. For instance, the sub-act 673 may involve providing one or more parity alerts within the target cloud computing system based on the parity scores. In various implementations, the sub-act 673 includes the plurality of target cloud computing systems receiving and processing the job package to determine the one or more parity alerts without providing the one or more parity alerts to the reference cloud computing system.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the parity drift system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 7:
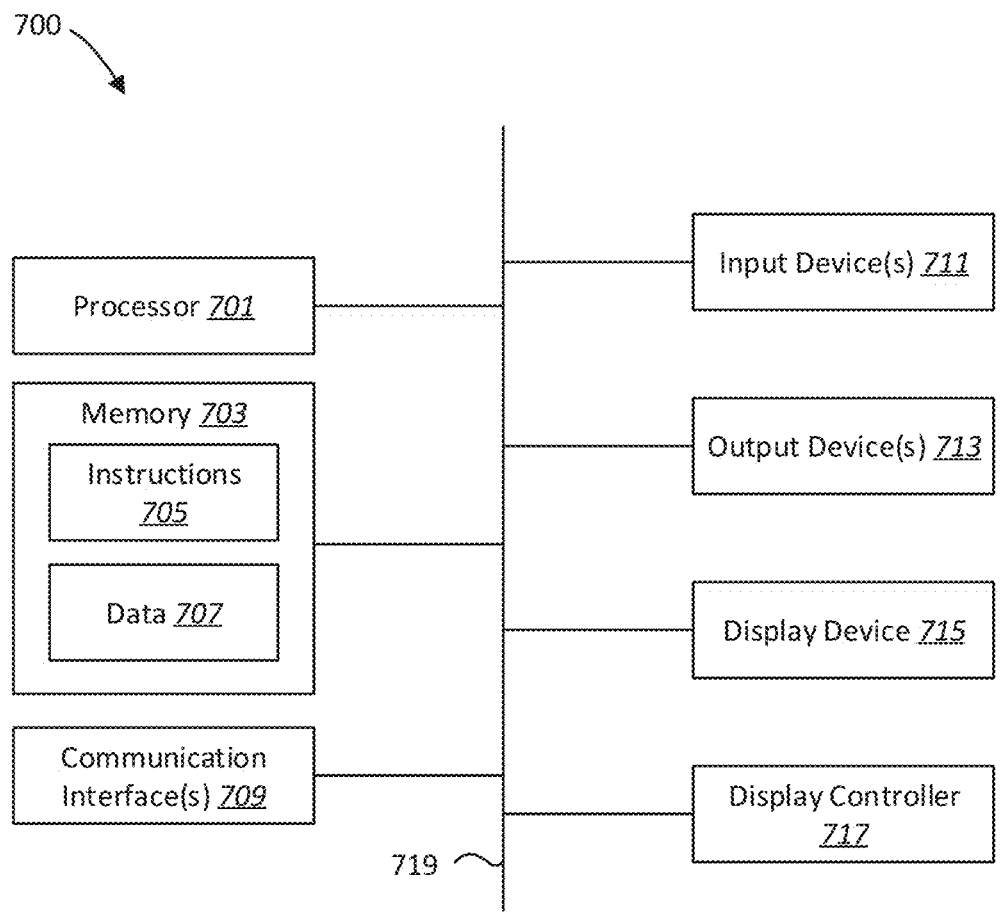
FIG. 7 illustrates certain components that may be included within a computer system.

FIG. 7 illustrates certain components that may be included within a computer system 700. The computer system 700 may be used to implement the various computing devices, components, and systems described herein.

In various implementations, the computer system 700 may represent one or more of the client devices, server devices, or other computing devices described above. For example, the computer system 700 may refer to various types of client devices capable of accessing data on a cloud computing system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. a specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for detecting instances of parity drift in cloud computing systems, comprising:
    receiving, at a target cloud computing system and from a reference cloud computing system, a job package comprising a query set and a reference data set generated by running the query set on the reference cloud computing system;
    in response to receiving the job package, generating, at the target cloud computing system, a target data set by running the query set from the job package on the target cloud computing system;
    determining, at the target cloud computing system, parity scores based on the job package stored on the target cloud computing system comprising the query set, the reference data set, and the target data set; and
    providing, by the target cloud computing system, one or more parity alerts based on the parity scores.

2. The computer-implemented method of claim 1, wherein the reference data set comprises a schema indicating state information and version information of network functions on the reference cloud computing system without including user data.

3. The computer-implemented method of claim 1, wherein determining the parity scores further comprises utilizing a plurality of report engines to determine a plurality of parity dimensions based on inputs from the reference data set and the target data set.

4. The computer-implemented method of claim 3, wherein determining the parity scores further comprises generating a parity report that includes a column for each of the plurality of parity dimensions.

5. The computer-implemented method of claim 1, wherein determining the parity scores comprises:
    generating a parity report between the reference data set and the target data set; and
    determining one or more parity scores based on the parity report and one or more parity score thresholds.

6. The computer-implemented method of claim 5, wherein determining the parity scores further comprises determining the parity report between the reference data set and the target data set based on parity configuration settings of the target cloud computing system.

7. The computer-implemented method of claim 5, further comprising:
    in response to determining the parity scores, adding the parity scores to the job package; and
    archiving, on the target cloud computing system, the job package comprising the query set, the target data set, the reference data set, the parity report, and the parity scores.

8. The computer-implemented method of claim 6, wherein determining the parity scores further comprises determining one or more parity scores based on the reference data set, the target data set, and one or more archived job packages.

9. The computer-implemented method of claim 1, wherein:
    The target cloud computing system is an air-gapped cloud computing system; and
    receiving the job package from a reference cloud computing system comprising receiving the job package via a one-way communication channel.

10. The computer-implemented method of claim 1, further comprising, adding the target data set to the job package stored on the target cloud computing system in response to generating the target data set.

11. The computer-implemented method of claim 1, further comprising detecting, based on the parity scores, one or more feature configurations of the target cloud computing system that triggers a parity alert threshold, wherein providing the one or more parity alerts is based on the parity alert threshold being triggered.

12. The computer-implemented method of claim 1, wherein the target cloud computing system is an on-premises cloud computing system operated by a different entity than operates the reference cloud computing system.

13. A target cloud computing system comprising:
    at least one processor; and
    a non-transitory computer memory comprising instructions that, when executed by the at least one processor, cause the target cloud computing system to:
        receive, from a reference cloud computing system, a job package comprising a query set and a reference data set generated by running the query set on feature configurations of the reference cloud computing system;

in response to receiving the job package, generate a target data set by running the query set from the job package on feature configurations of the target cloud computing system;

determine a parity dimension report between the reference data set and the target data set;

generate one or more parity scores based on the parity dimension report and one or more parity score thresholds; and provide one or more indications of a parity alert based on the one or more parity scores.

14. The target cloud computing system of claim 13, wherein the reference data set comprises control data while omitting user data.

15. The target cloud computing system of claim 13, wherein determining the parity dimension report further comprises utilizing a plurality of report engines to determine a plurality of parity dimensions based on inputs from the reference data set and the target data set.

16. The target cloud computing system of claim 15, wherein the parity dimension report comprises a table of columns comprising an output for each of the plurality of report engines.

17. The target cloud computing system of claim 13, further comprising instructions that, when executed by the at least one processor, cause the target cloud computing system to append the one or more parity scores to the parity dimension report.

18. A computer-implemented method for detecting instances of parity drift in cloud computing systems, comprising:

generating, by a reference cloud computing system, a job package that comprises a feature configuration query set and a reference data set that is generated by running the feature configuration query set on the reference cloud computing system; and providing the job package to a plurality of target cloud computing systems, wherein providing the job package to each target cloud computing system causes the target cloud computing system to:
 supplement the job package with a target data set generated by running the feature configuration query set on the target cloud computing system;
 generate parity scores based on the supplemented job package comprising the query set, the reference data set, and the target data set; and
 provide one or more parity alerts within the target cloud computing system based on the parity scores.

19. The computer-implemented method of claim 18, wherein the plurality of target cloud computing systems comprises a cloud computing system operated by competing cloud computing system providers.

20. The computer-implemented method of claim 18, wherein the plurality of target cloud computing systems receives and processes the job package to determine the one or more parity alerts without providing the one or more parity alerts to the reference cloud computing system.

* * * * *